United States Patent [19]

Kisylia

[11] 3,988,717

[45] Oct. 26, 1976

[54] GENERAL PURPOSE COMPUTER OR LOGIC CHIP AND SYSTEM

[75] Inventor: Andrew P. Kisylia, Agoura, Calif.

[73] Assignee: Litton Systems, Inc., Beverly Hills, Calif.

[22] Filed: Aug. 6, 1975

[21] Appl. No.: 602,302

[52] U.S. Cl. .......... 340/172.5
[51] Int. Cl.² .......... G06F 1/00
[58] Field of Search .......... 340/172.5

[56] References Cited

UNITED STATES PATENTS

| | | | |
|---|---|---|---|
| 3,462,742 | 8/1969 | Miller et al. | 340/172.5 |
| 3,579,201 | 5/1971 | Langley | 340/172.5 |
| 3,757,306 | 9/1973 | Boone | 340/172.5 |
| 3,757,308 | 9/1973 | Fosdick | 340/172.5 |
| 3,821,715 | 6/1974 | Hoff et al. | 340/172.5 |
| 3,878,514 | 4/1975 | Faber | 340/172.5 |
| 3,879,713 | 4/1975 | Bettin et al. | 340/172.5 |
| 3,892,957 | 7/1975 | Bryant | 340/172.5 X |

*Primary Examiner*—Raulfe B. Zache

[57] ABSTRACT

A general purpose logic chip may be replicated for use to construct both the arithmetic unit and the control sections of a computer or other digital data processing or logic circuitry. The chip includes a number of features which when taken together permits its use for a wide variety of data processing functions, including as noted above, the basic arithmetic logic unit and associated functions in addition to micro-operational code control functions. The chip includes a 4-bit arithmetic unit and four registers associated with the arithmetic unit for handling inputs or outputs to and from the arithmetic logic unit. Mode code terminals are provided to implement micro-program control logic circuitry permitting several of the chips to operate on "bytes" or sets of bits of long digital numbers in parallel, without additional circuitry. A random access memory having 16 words, 4 bits each, is provided with alternative addressing circuits to be conveniently accessed either as a "first-in, last-out stack" or as a random access memory register file, or both. Required timing and control are developed within the chip and associated memories to minimize the need for special or additional control circuitry. Additional flexibility is provided for multiple multiplexing circuitry and circuit implementation permitting direct connection of leads from several of the chip outputs. A number of chips of this single type of chip are employed in the implementation of a large class of computer and other data processing systems, employing input/output functions, memory process functions, as well as arithmetic and central processing unit functions.

15 Claims, 44 Drawing Figures

Fig_1
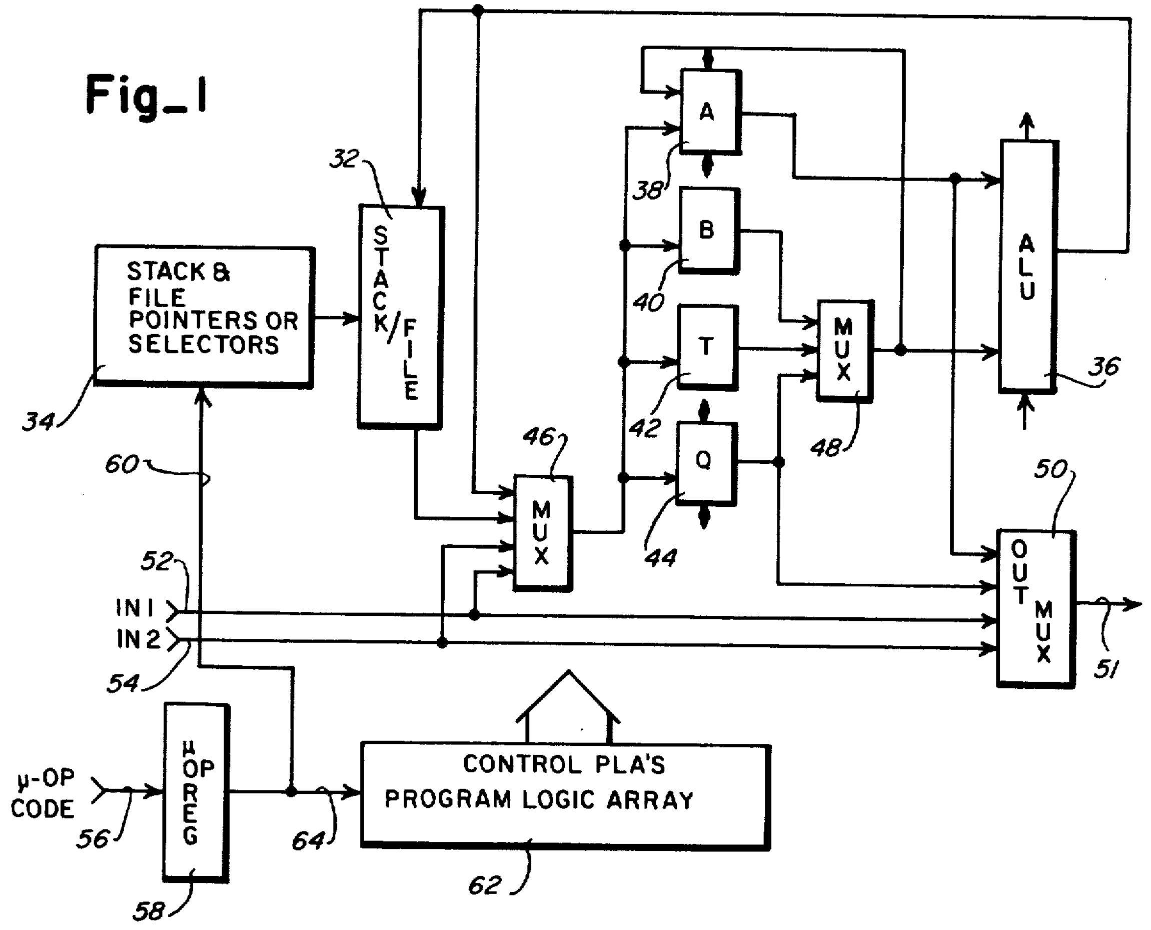
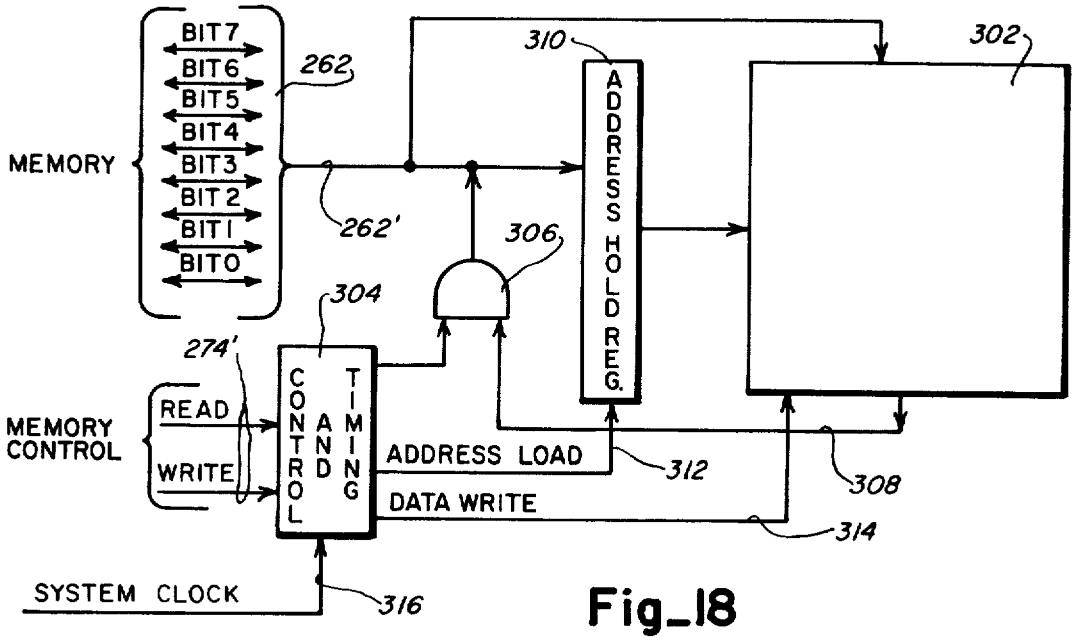
Fig_18

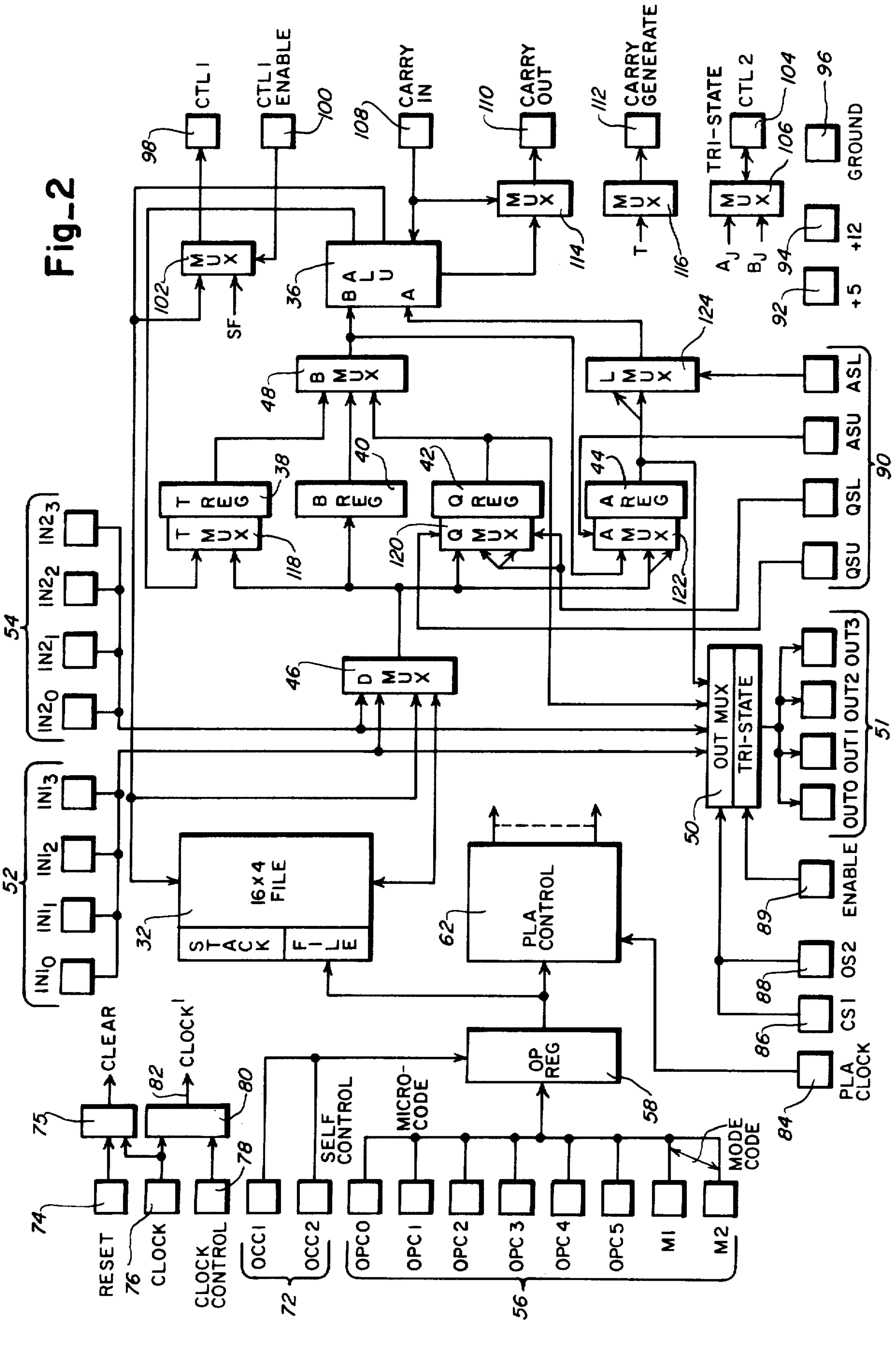
Fig_2

Fig_3
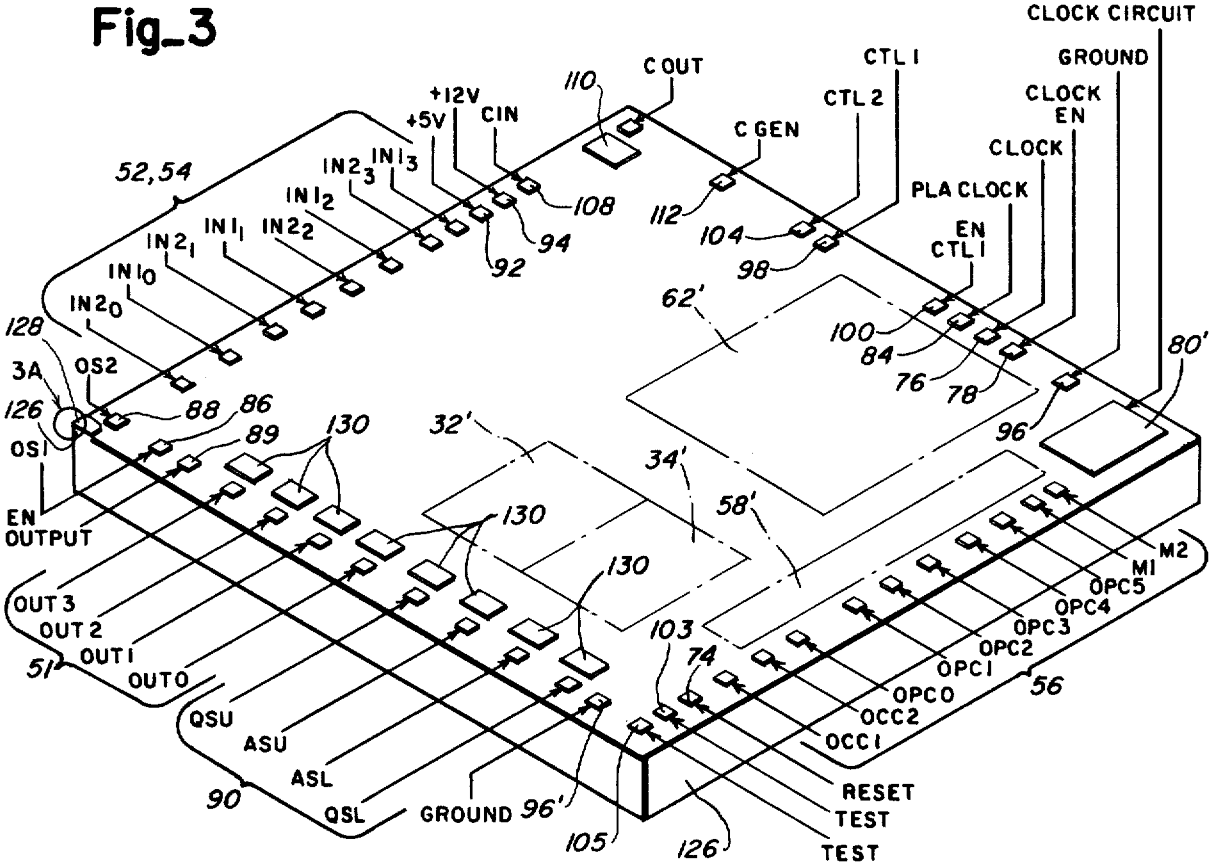
Fig_3A
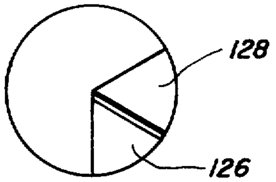
| | | | | |
|---|---|---|---|---|
| Fig_4B | Fig_4C | Fig_4D | Fig_4E | Fig_4F |
| Fig_4G | Fig_4H | Fig_4I | Fig_4J | Fig_4K |
Fig_4A Fig_4B
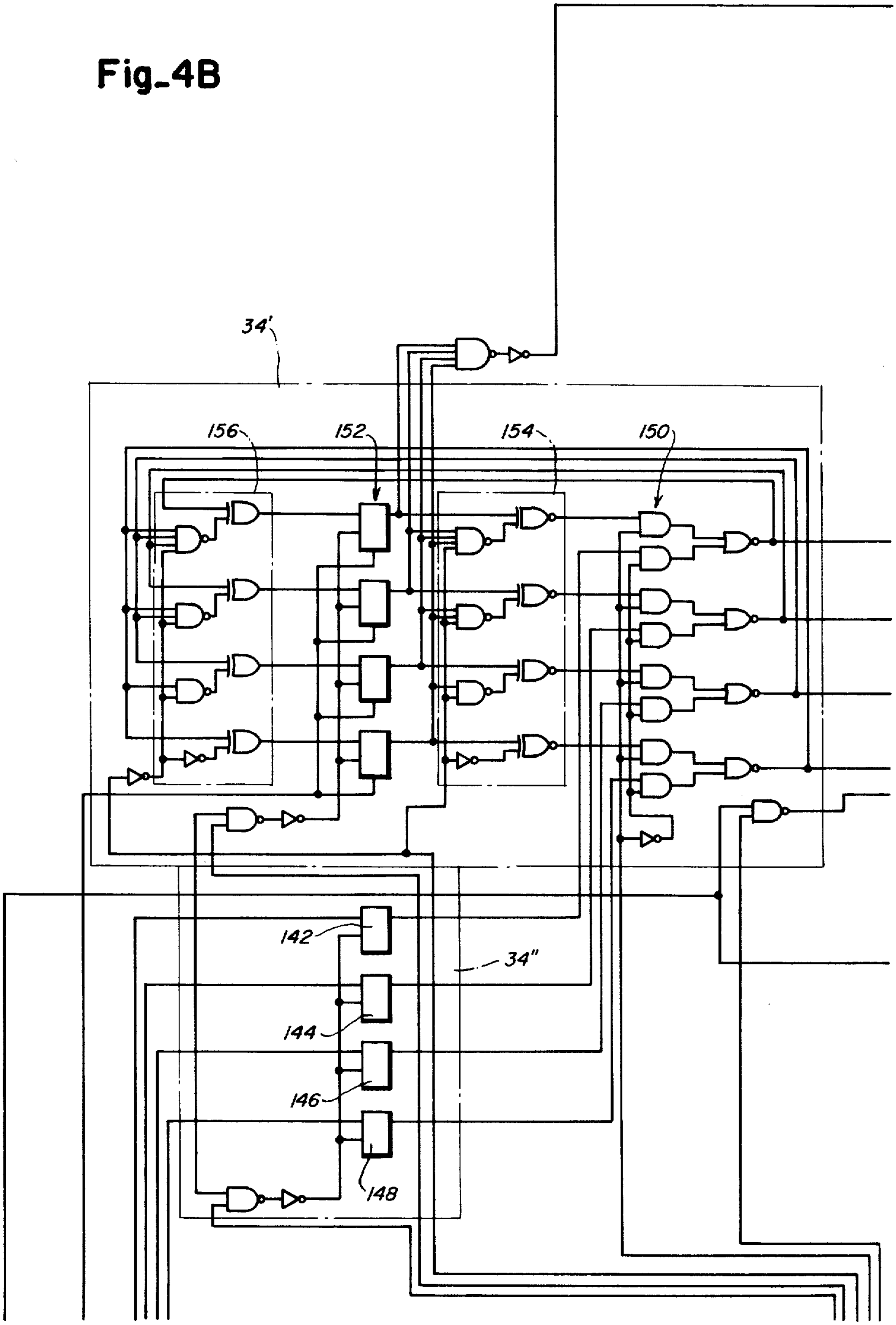

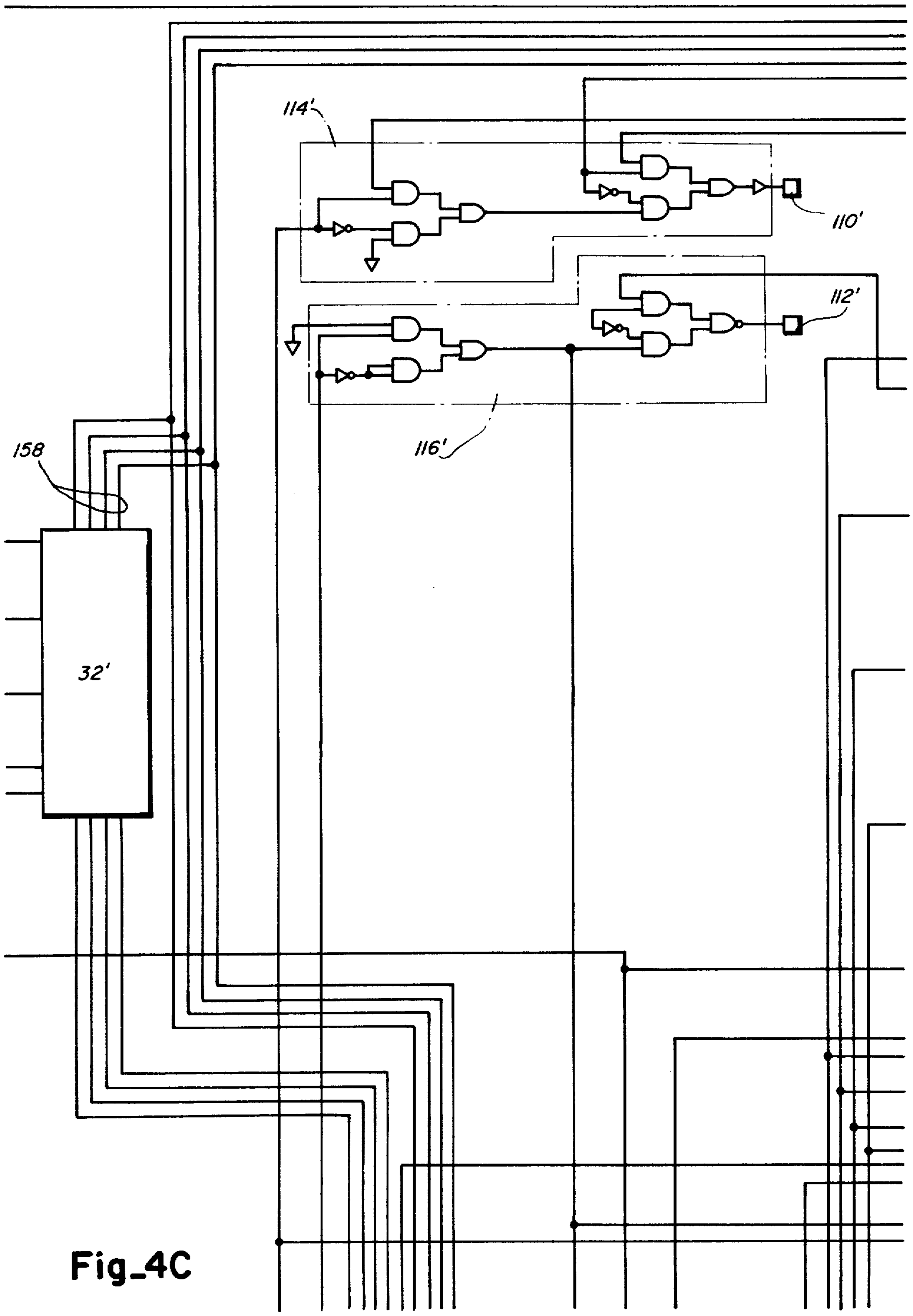
Fig_4C

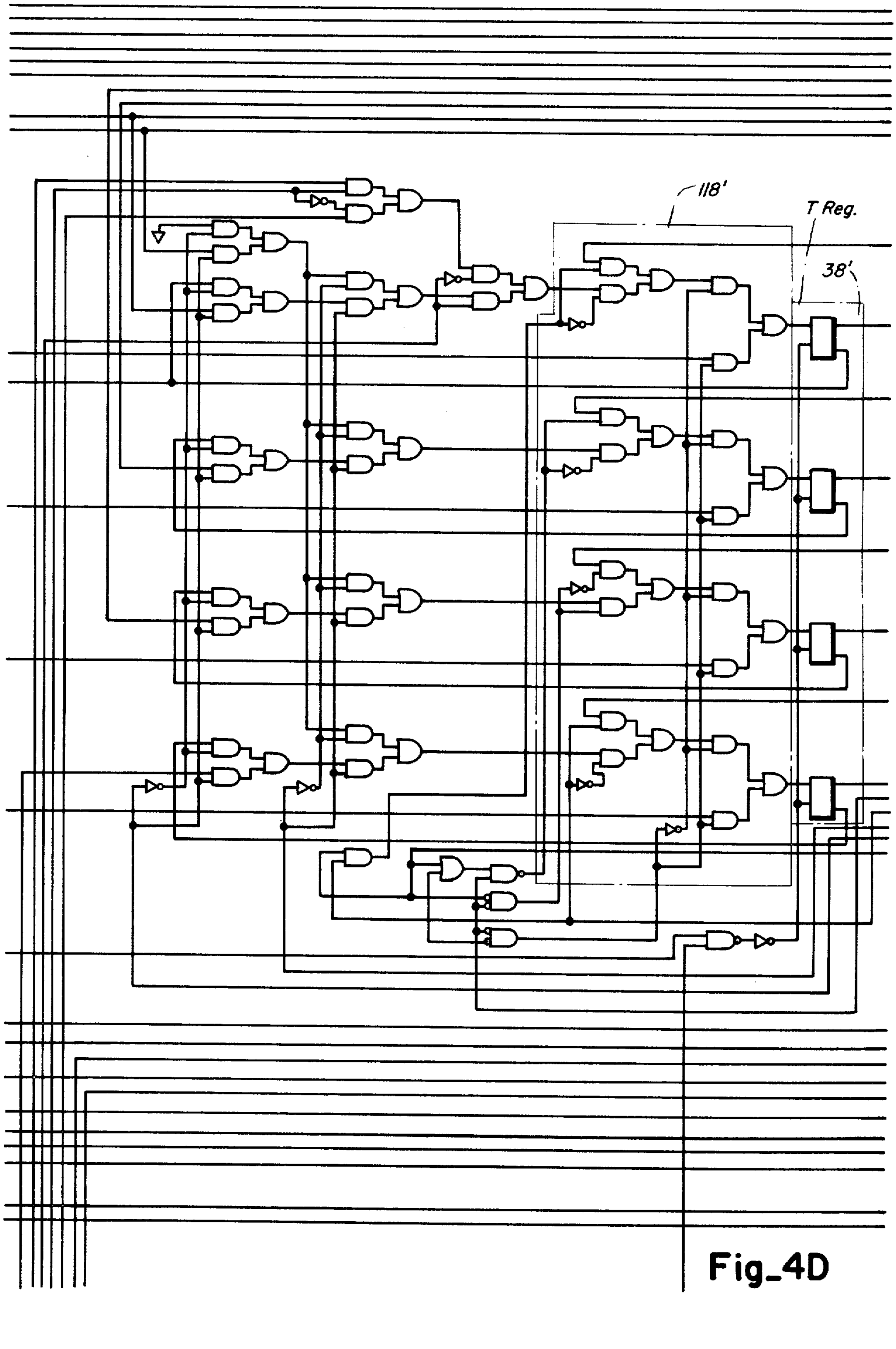
Fig_4D

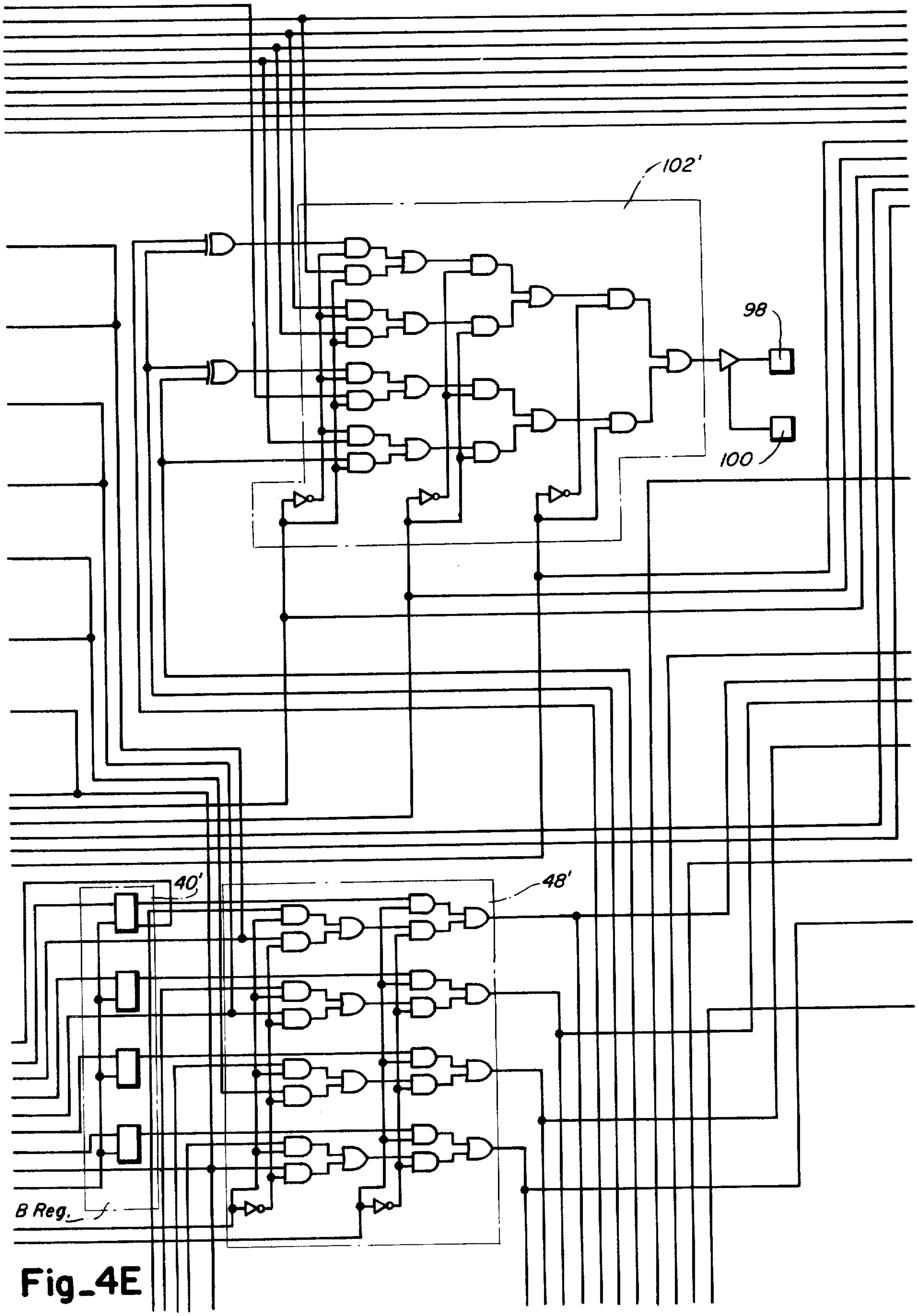
Fig_4E

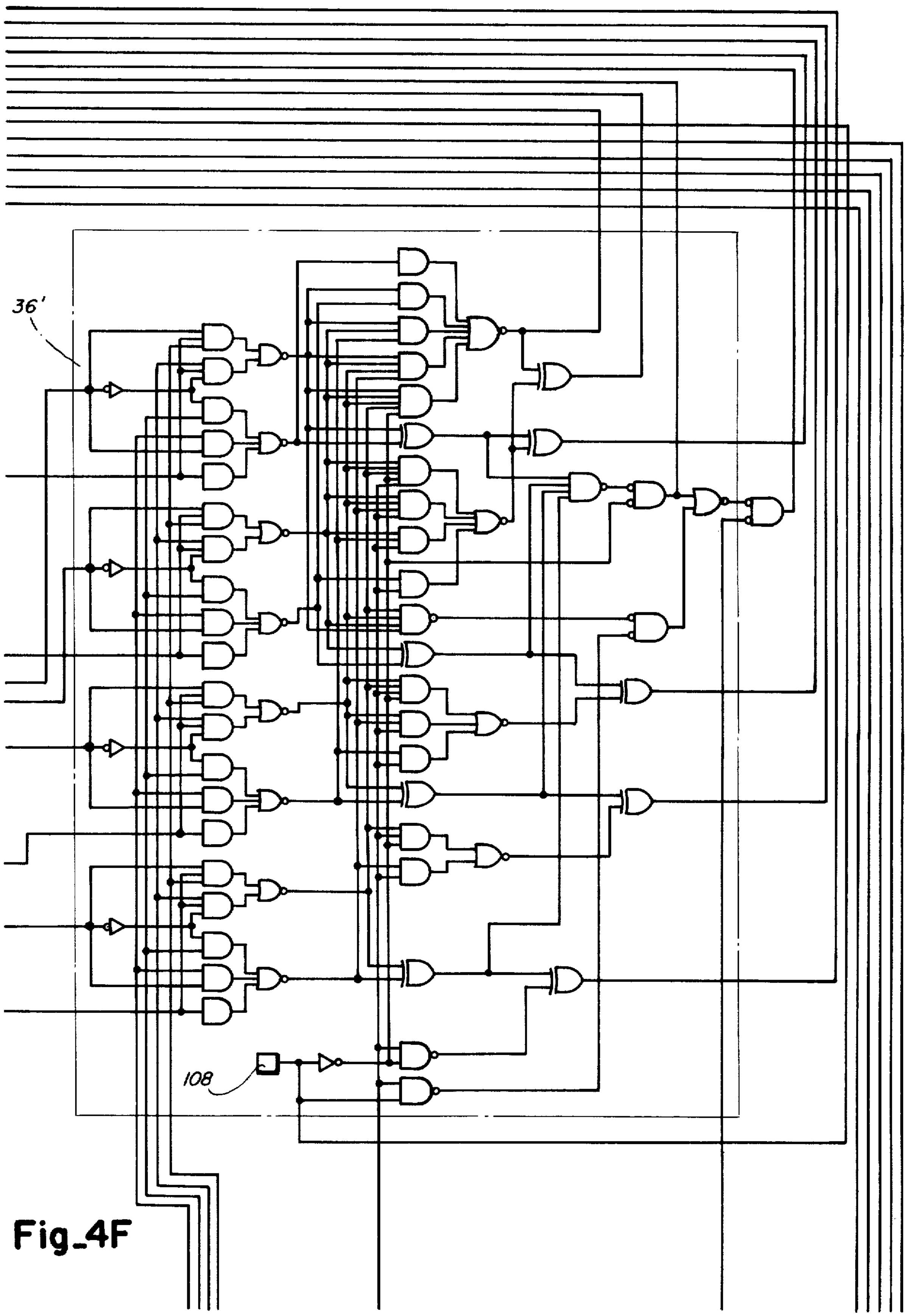
Fig_4F

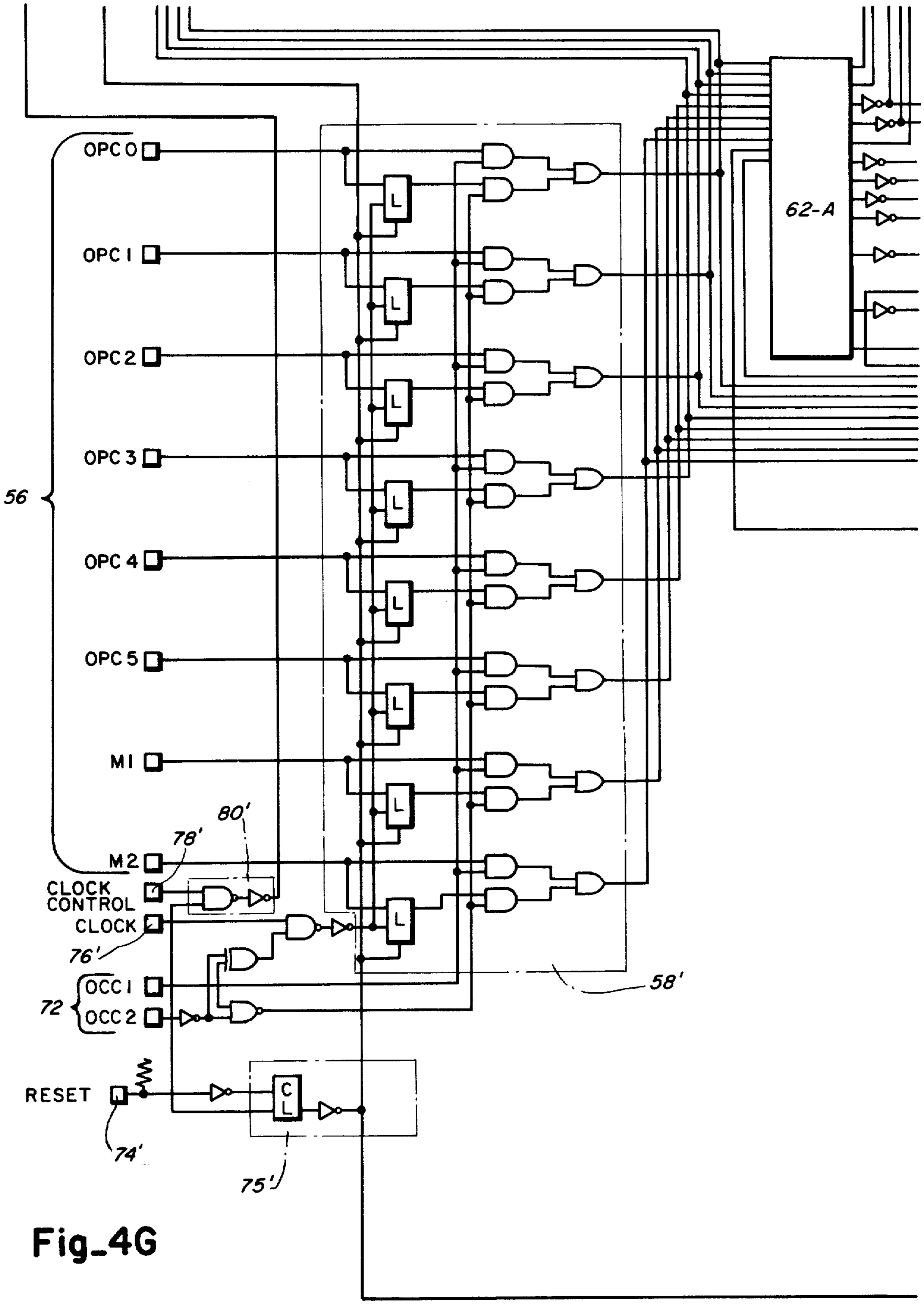
Fig_4G

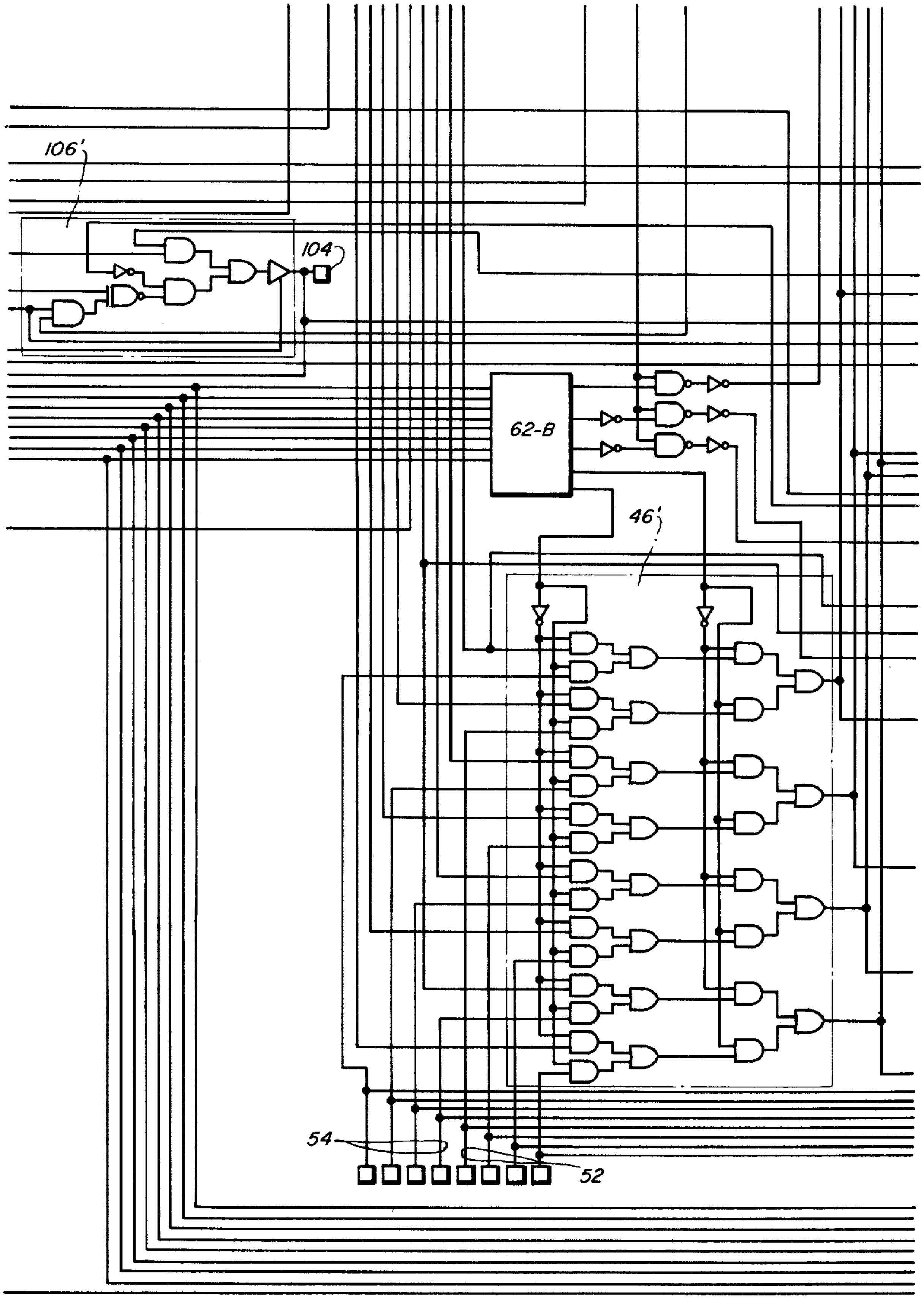
Fig_4H

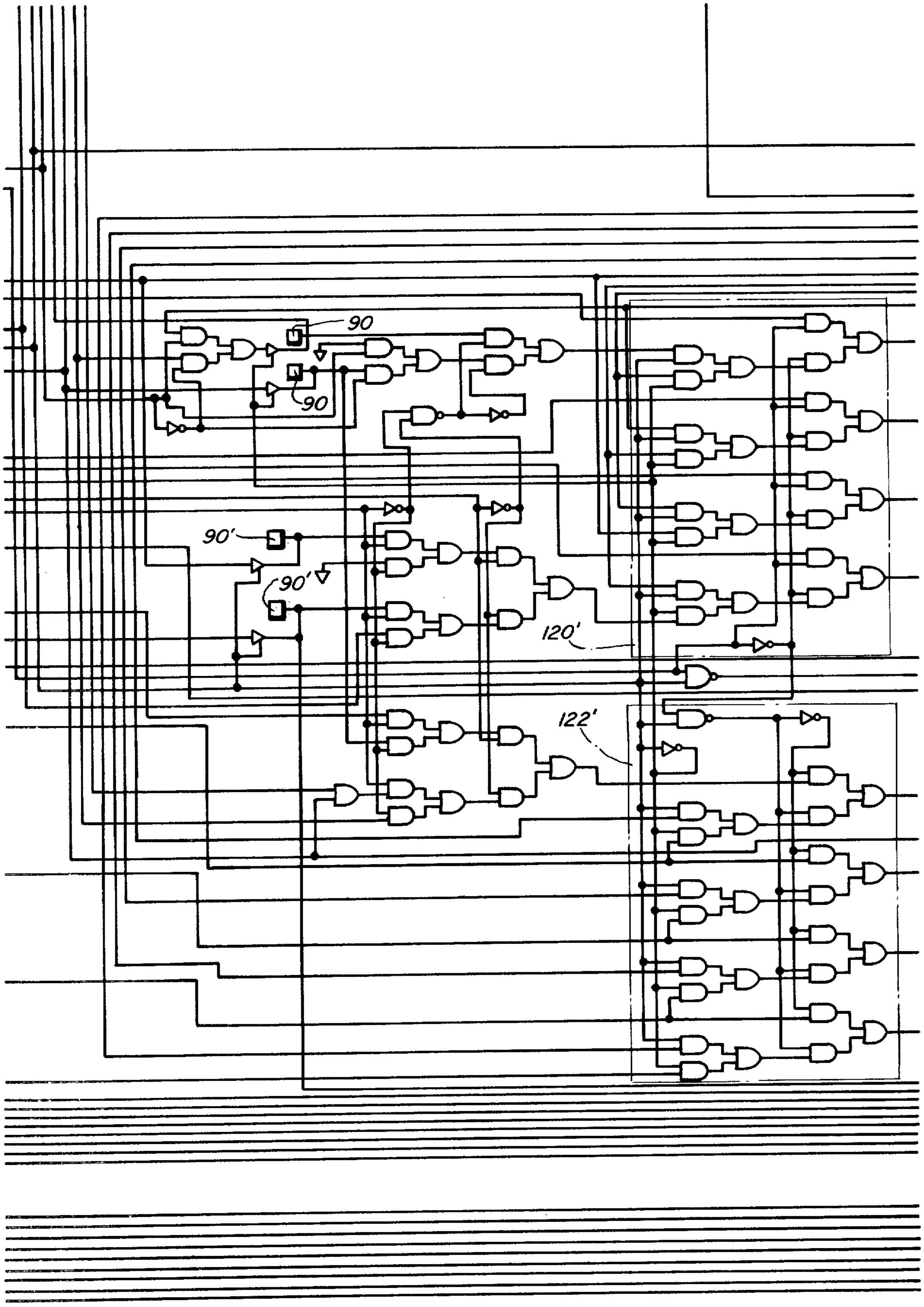
Fig_4I

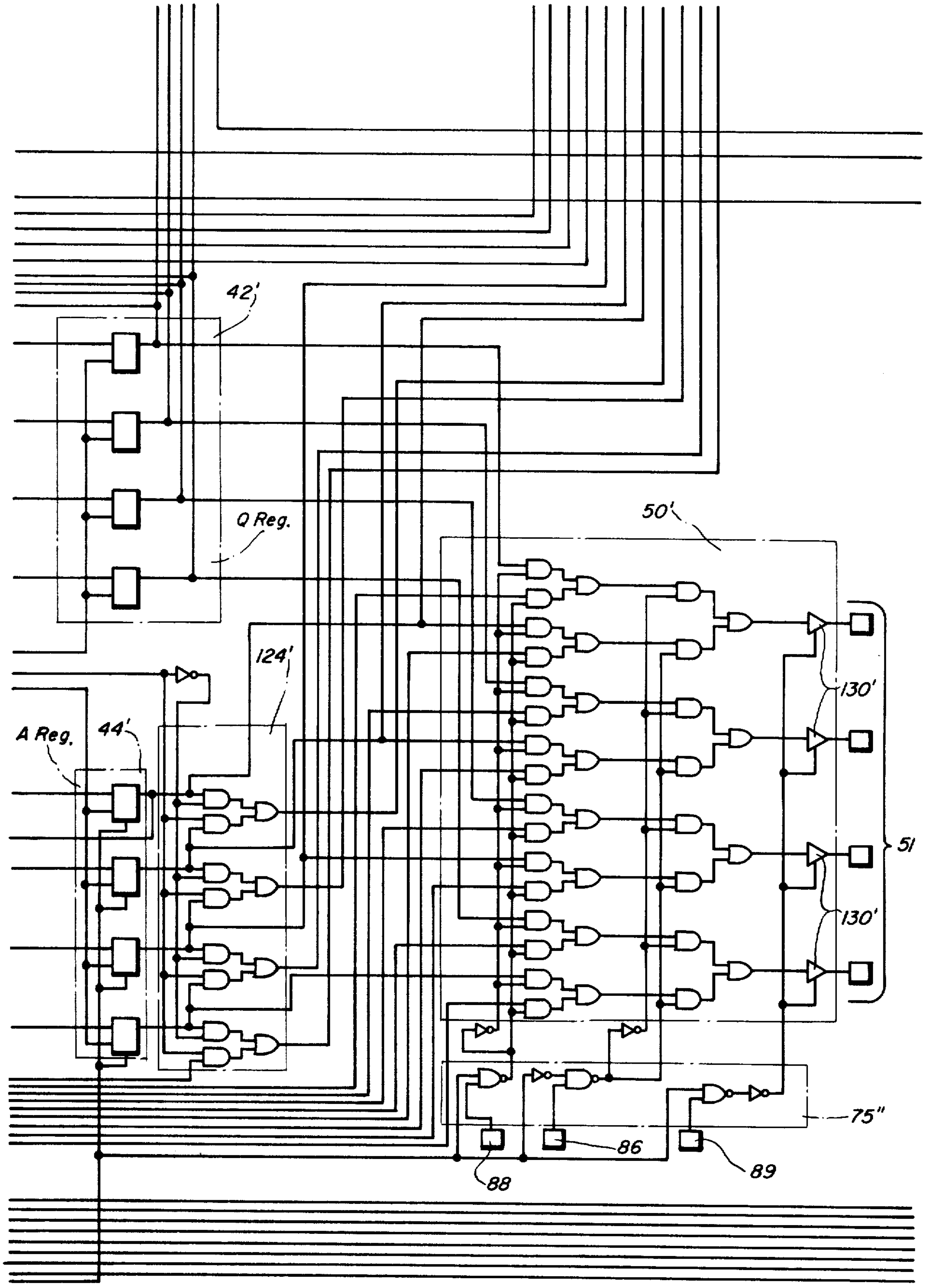
Fig_4J

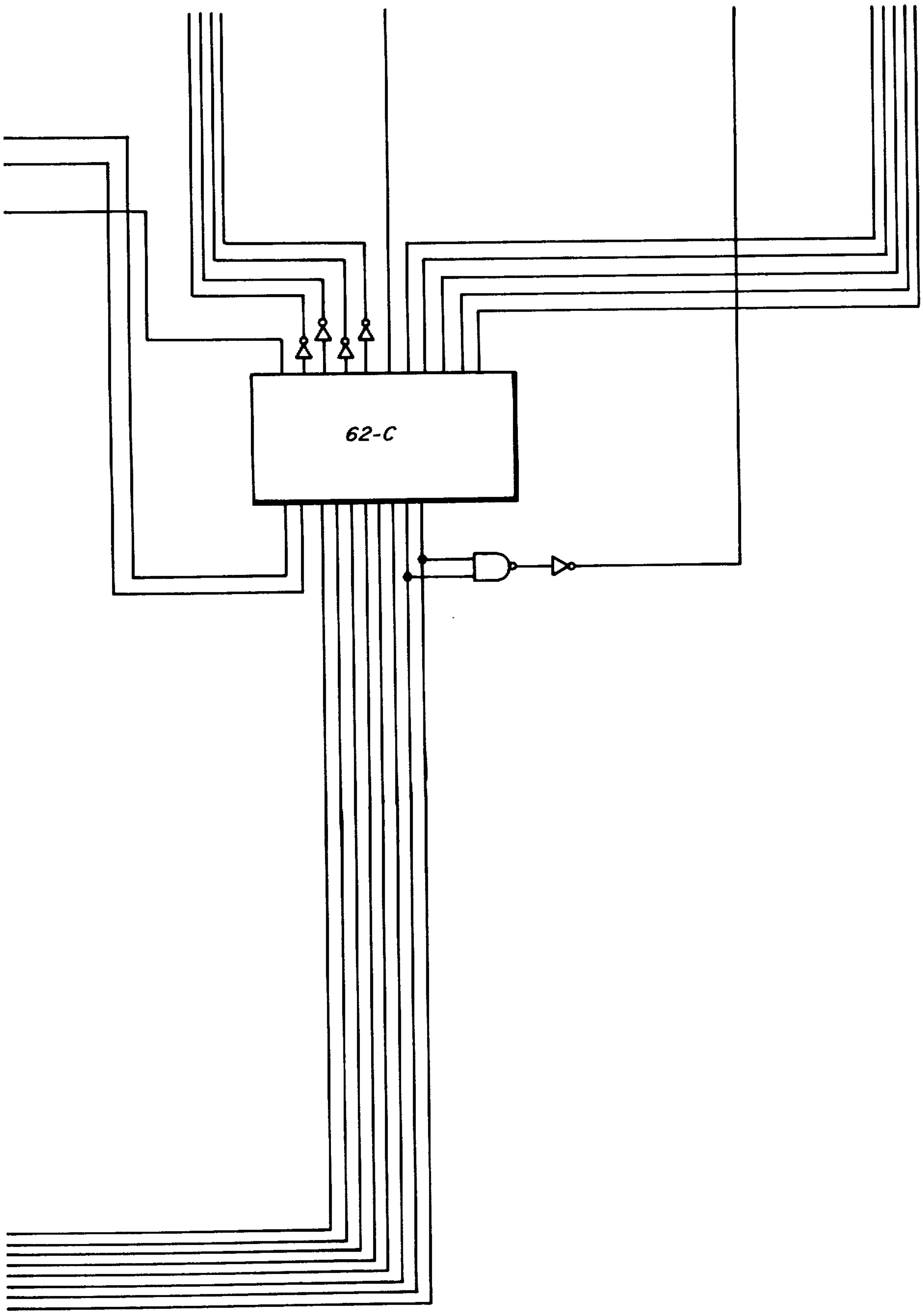
Fig_4K

Fig_5A
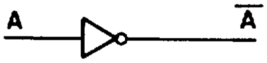
INVERTER
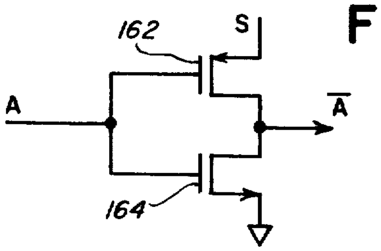
Fig_5B
Fig_6A
NAND GATE
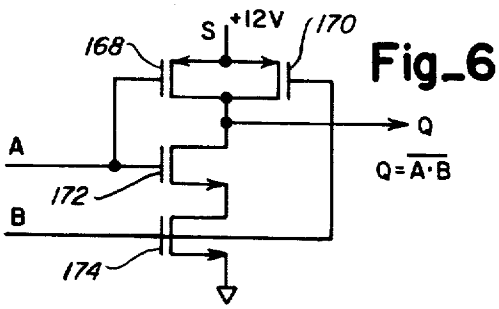
Fig_6B
Fig_7A
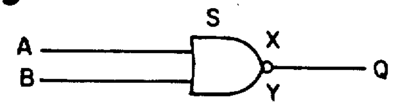
NOR GATE
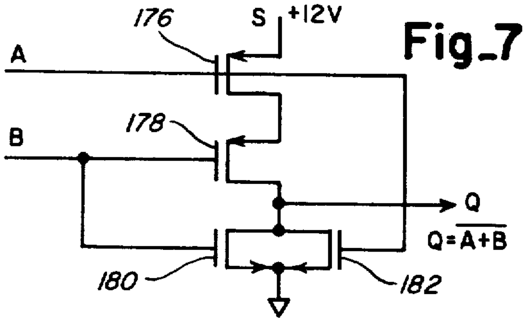
Fig_7B
Fig_8A
EXCLUSIVE
OR GATE
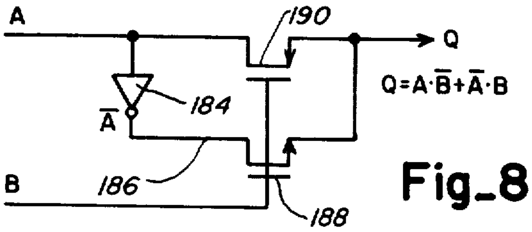
Fig_8B
Fig_9A
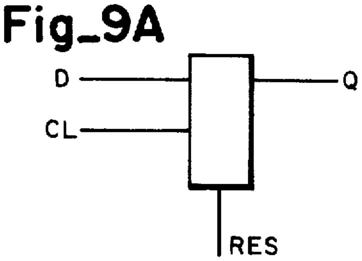
D FLIP-FLOP
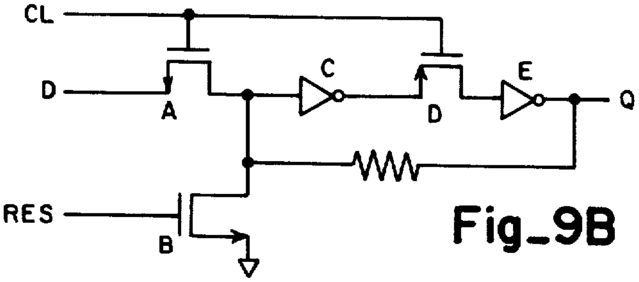
Fig_9B Fig_10A
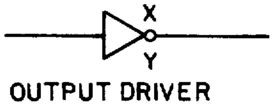
Fig_10B
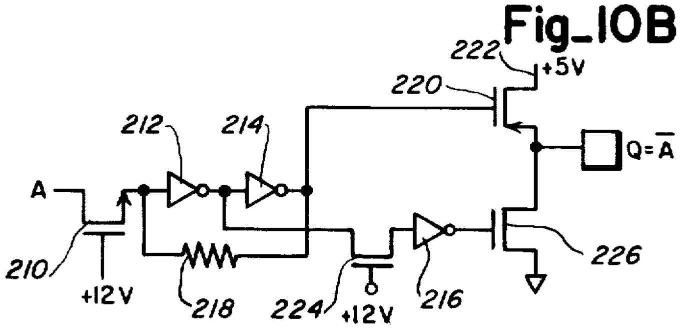
Fig_11A
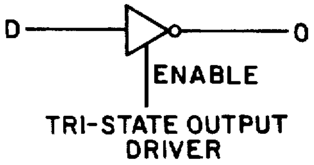
Fig_11B
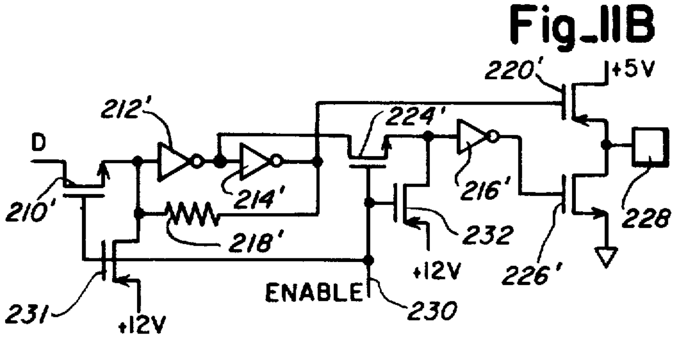
Fig_12A
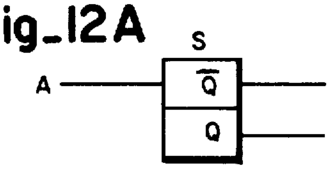
Fig_12B
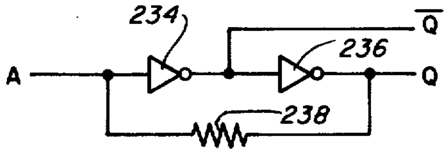
Fig_13A
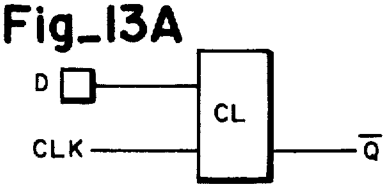
Fig_13B
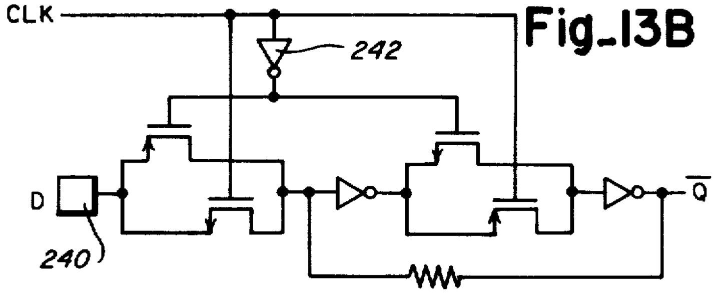
Fig_14A
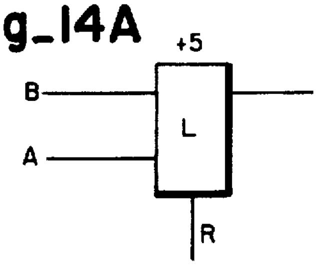
Fig_14B
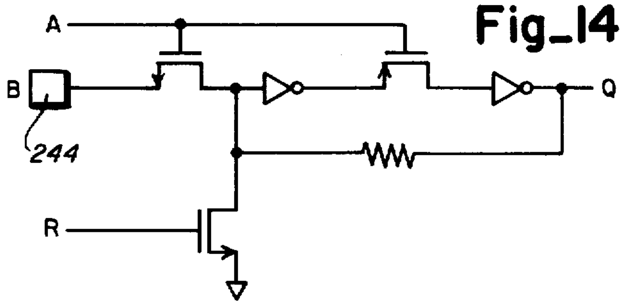

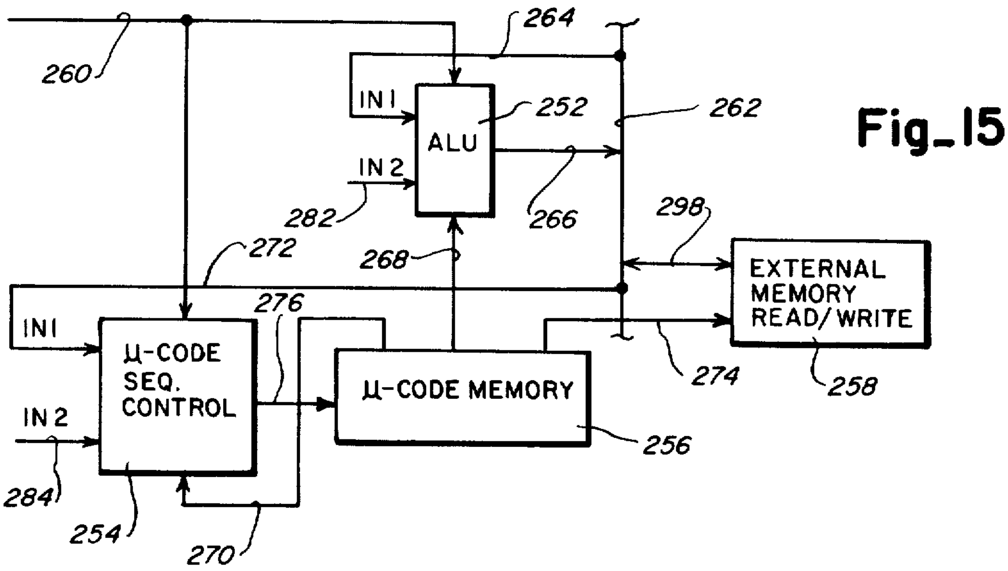
Fig_15
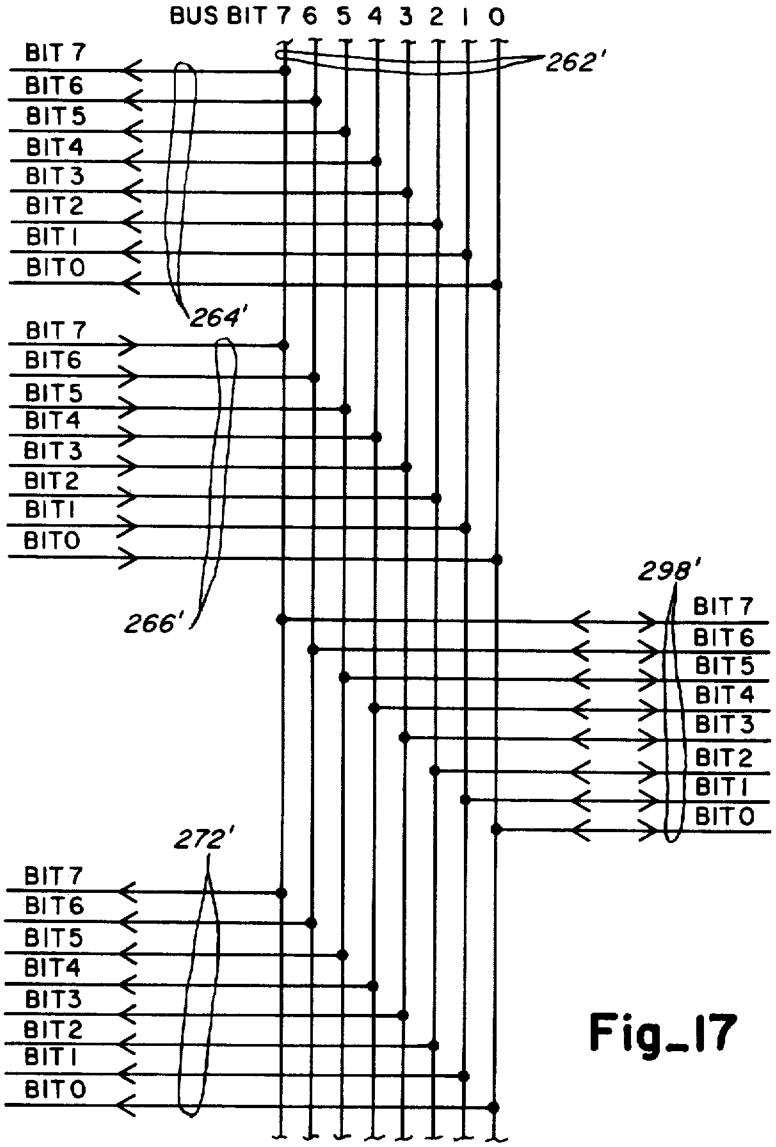
Fig_17

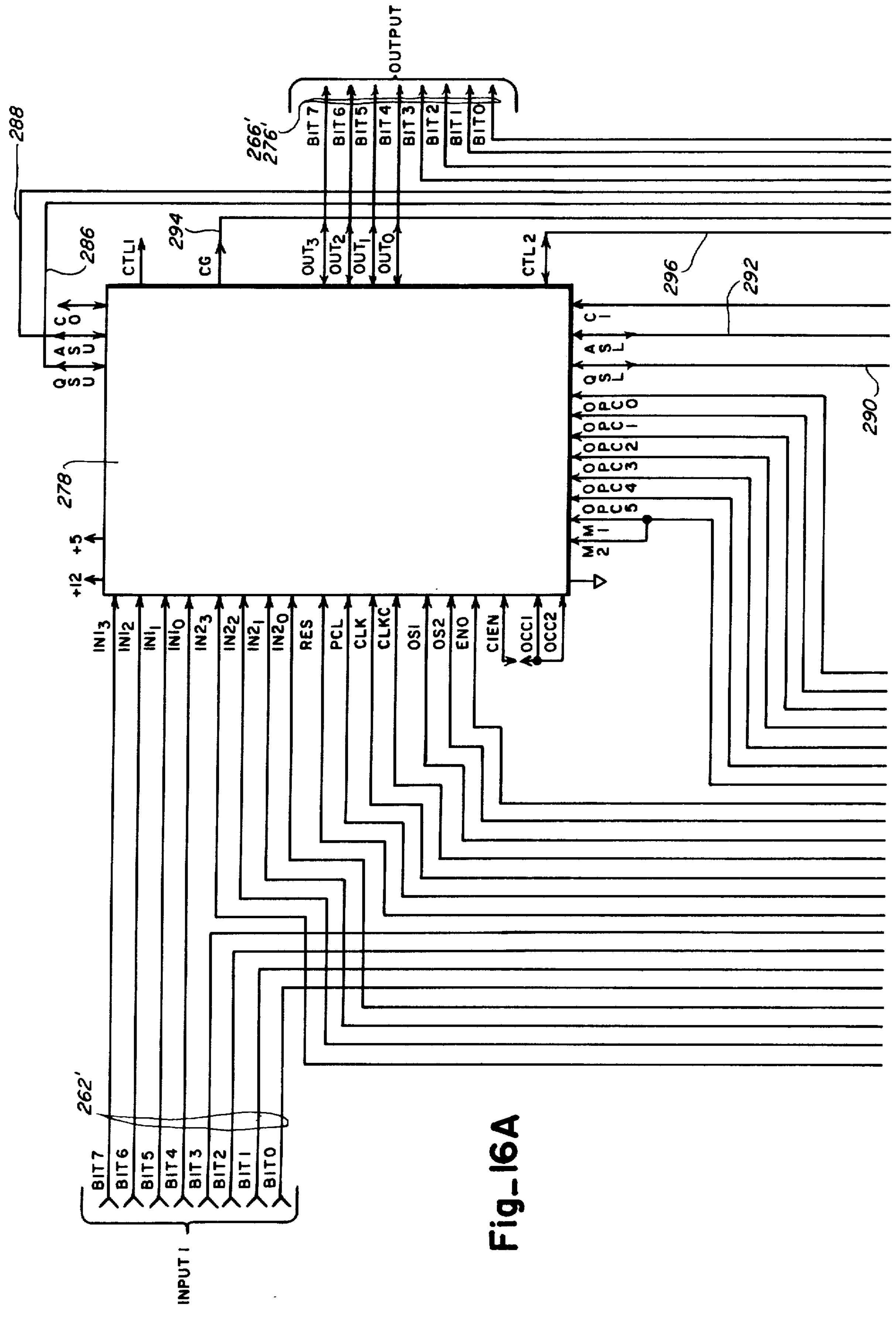
Fig_16A

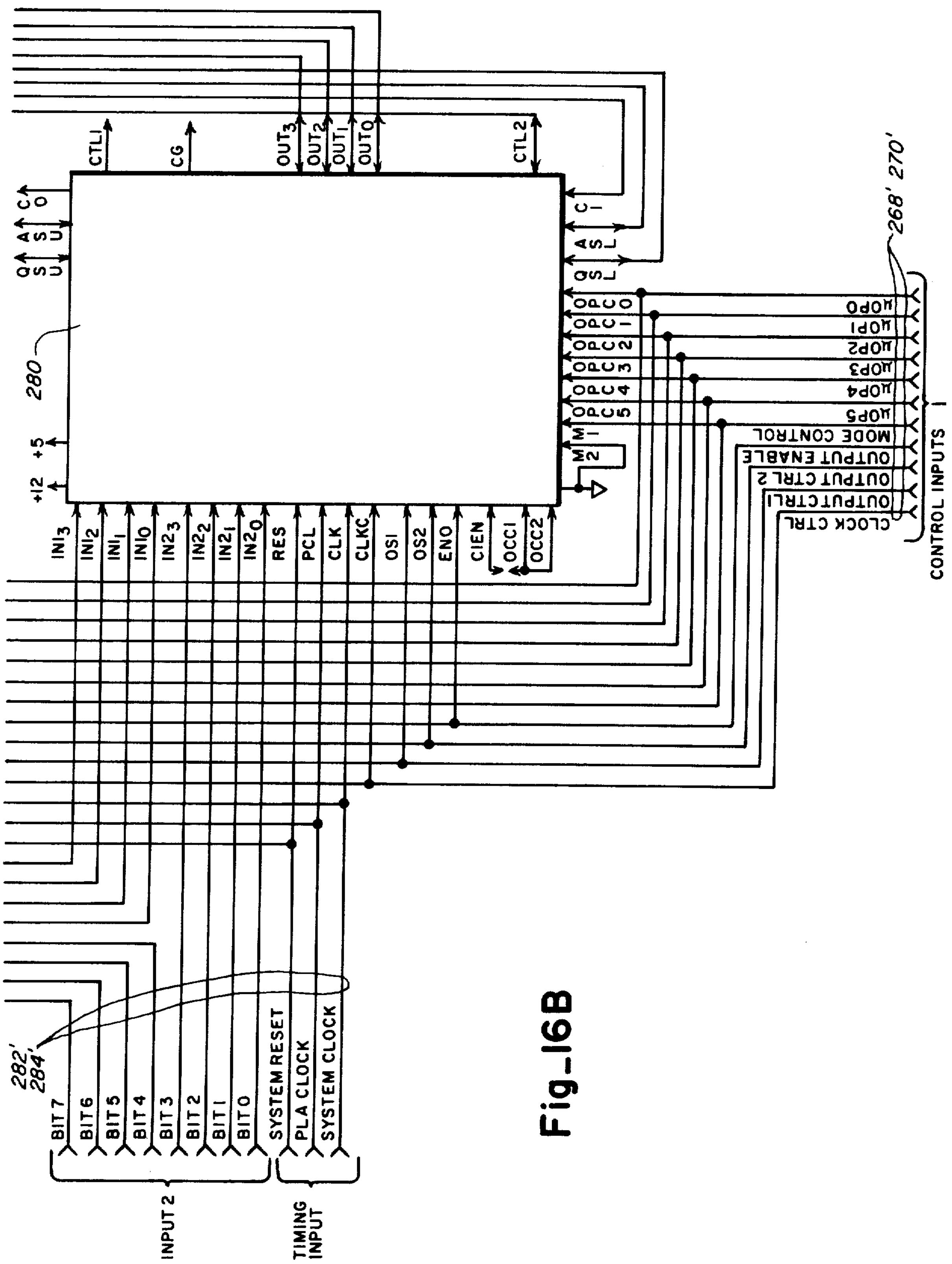
Fig_16B

Fig_19
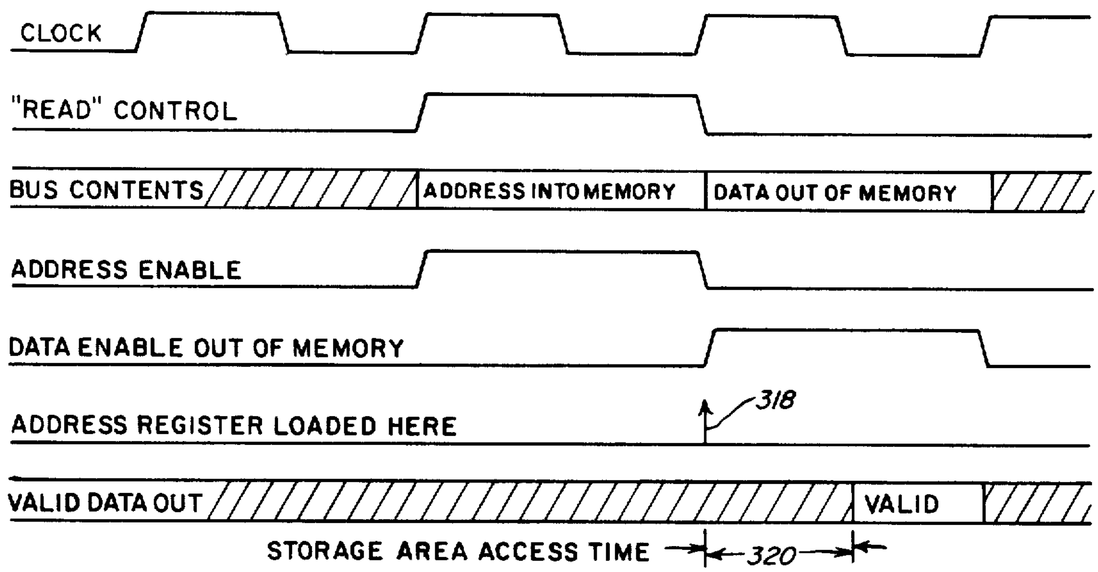
Fig_20
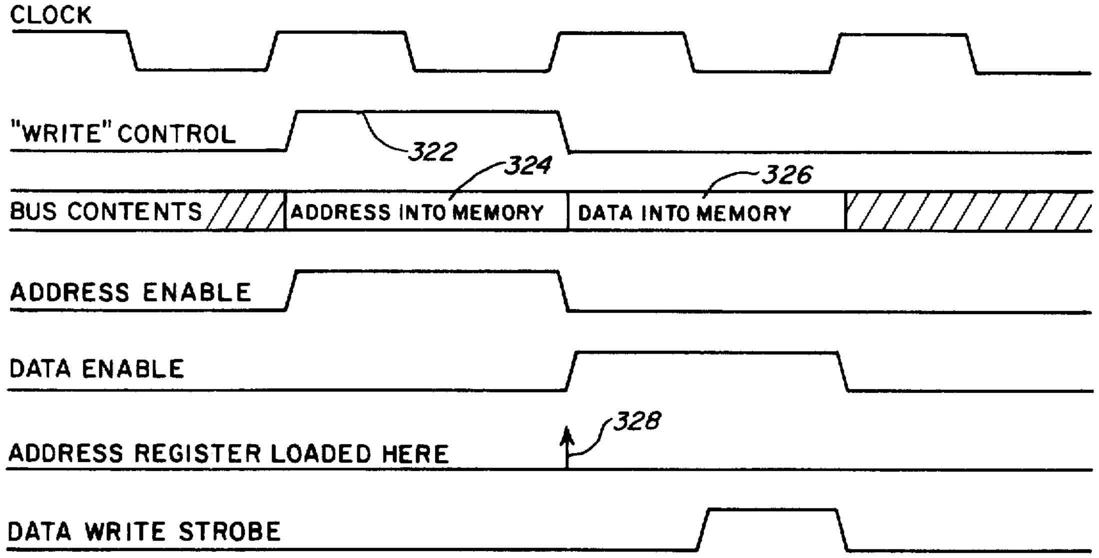

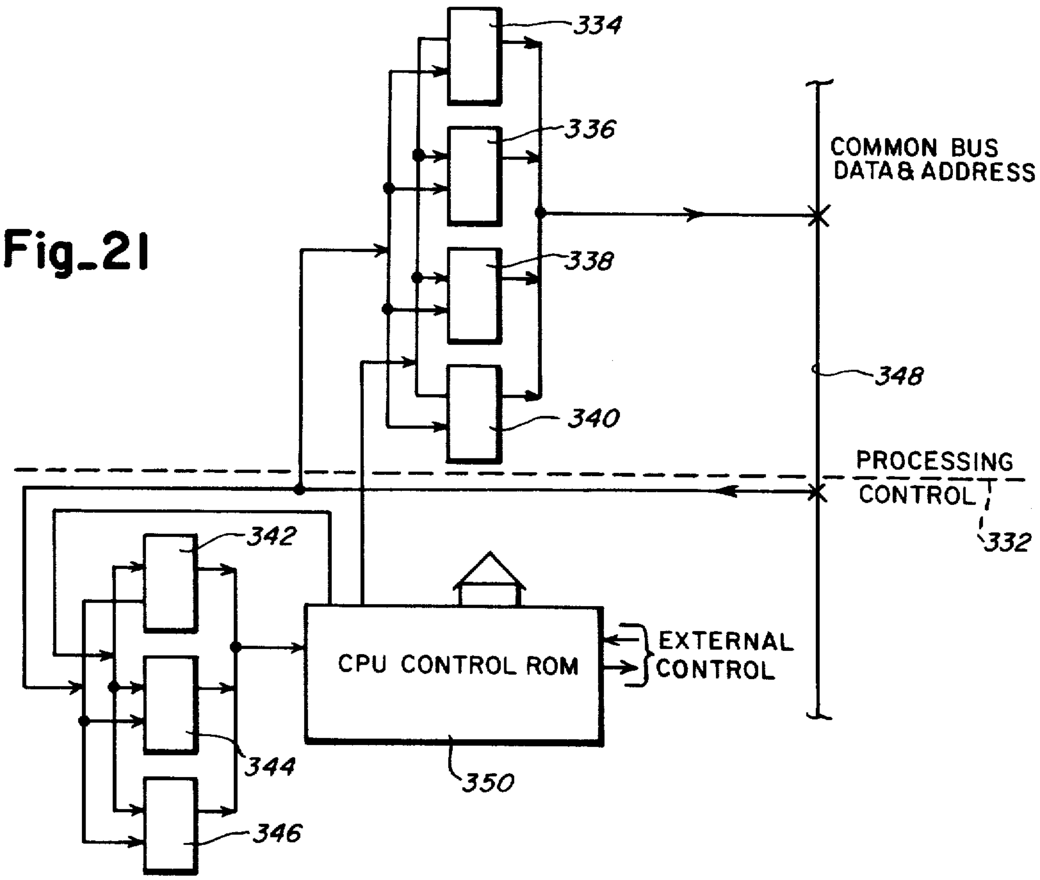
Fig_21
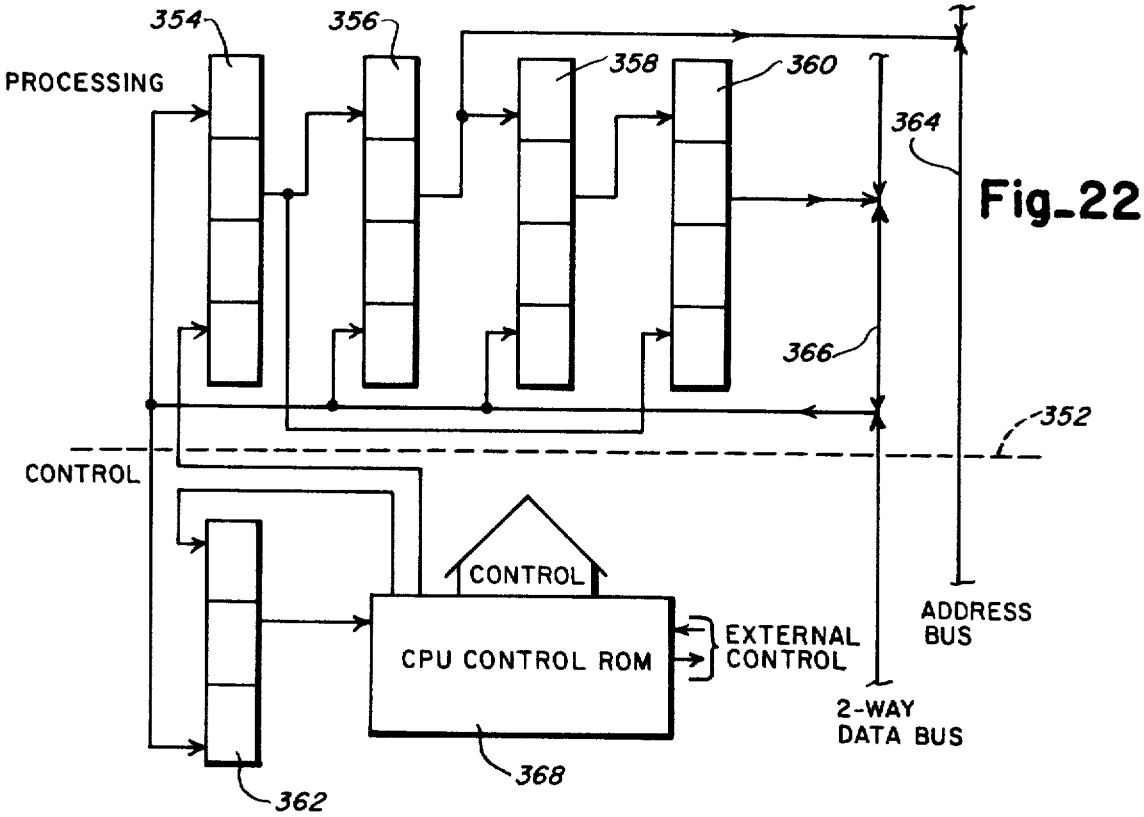
Fig_22

GENERAL PURPOSE COMPUTER OR LOGIC CHIP AND SYSTEM

BACKGROUND OF THE INVENTION

As higher density semiconductor chips have become available, it has been proposed to put large numbers of active circuits on a single chip. The equivalent of several thousand transistors can now be placed on a single chip only one-fifth of an inch square. Up to the present time, however, the chips have generally been special purpose in nature rather than of general utility. Further, to the extent that general purpose chips have been proposed, they have normally been directed to a specific class of problem rather than encompassing a wide variety of computer and other digital logic applications.

It is a principal object of the present invention to provide a general purpose logic and computer chip which is sufficiently versatile to have wide applicability, and will still have its logic capability and capacity utilized to a substantial extent in each different type of logic function or computer function in which it may be employed.

SUMMARY OF THE INVENTION

In accordance with one important aspect of the invention, both the arithmetic unit and the microcode control unit of a computer system is equipped with the same type of general purpose computer chip, with the chips having special features to efficiently accomplish the functions of both types of logic units. A computer system control memory may be provided to apply microcode control signals to each of the general purpose chips under control of address signals supplied by the microcode control unit; and additional memory circuitry may be provided to supply data to said arithmetic unit under control of addresses supplied by the arithmetic unit.

Other features of the invention include provision on the general purpose chip of a special memory which includes circuit arrangements for easy access to the memory so that it may be used either as a "first-in, last-out stack" or as a random access memory register file, or both, in the course of performing desired logic operations; an arithmetic logic unit with several associated registers performing respectively different convenient input and output functions relative to the arithmetic logic unit; special multiple multiplexing arrangements for flexibility in logic circuit operations; and special control programmable logic arrays which decode the micro instructions applied to each chip and apply the appropriate control signals to the remainder of the chip.

In accordance with another important aspect of the invention, a general purpose computer chip is provided which includes a number of register and logic circuits for storing and processing "bytes" of information, in which each byte includes a discrete number of bits of digital information; and where mode code terminals secured to said chip are selectively activated to control each different chip to handle the designated most significant byte, the least significant byte, or a byte of intermediate significance of the digital number being processed, or to control the selected chip to operate independent of other chips in the system.

Additional features of the new general purpose chip include the access circuitry associated with the chip's special memory, involving both a random access address register and a file access address register, with the file access address register being provided with incrementing and decrementing local recirculating circuits for rapidly and sequentially accessing adjacent memory locations; and for permitting random access to the special memory without losing the file access location address; "multiple multiplexing" circuits to facilitate flexible routing of digital information in and through the chip; tri-state output circuits including a high impedance output so that output terminals can be directly interconnected without additional buffering circuitry external to the chip; and the provision of several "byte" registers associated with the arithmetic unit of each special chip, and including associated switching arrangements for the direct and shifted routing of parallel digital information into and out of these registers.

BRIEF DESCRIPTION OF THE DRAWINGS

FIGS. 1 and 2 are block diagrams of general purpose computer or logic chip, with FIG. 2 being developed to a greater degree of depth than FIG. 1;

FIG. 3 is a diagrammatic showing of certain aspects of the physical configuration of the chip itself;

FIG. 3A is a detail of one corner of the chip of FIG. 3.

FIGS. 4A through 4K taken together constitute a detailed logic diagram of the general purpose chip, with the diagram of FIG. 4A indicating the arrangement of the sheets making up FIGS. 4B through 4K required to show the complete logic circuit;

FIGS. 5A and 5B, through 14A and 14B show the relationship between the logic symbols employed in the circuit of FIGS 4B through 4K and actual transistor or semiconductor logic circuitry which may be employed to implement the logic; thus, FIG. 5A shows the symbol for an inverter and FIG. 5B shows the transistor implementation of the inverter; similarly, FIGS 6A and 6B show a NAND gate; FIGS. 7A and 7B show a NOR gate; FIGS. 8A and 8B show an Exclusive-Or gate; FIGS. 9A and 9B show one form of flip-flop; FIGS. 10A and 10B show an output driver circuit; FIGS. 11A and 11B show a tristate output driver; FIGS. 12A and 12B, as well as FIGS. 13A and 13B and FIGS. 14A and 14B, show additional special forms of flip-flops;

FIG. 15 shows a relatively simple computer circuit employing four of the general purpose chips;

FIGS. 16A and 16B make up a single more detailed circuit diagram of each of the two pairs of chips of FIG. 15, showing their electrical interconnections;

FIG. 17 shows the bus interconnection circuit for the computer circuit of FIG. 15;

FIG. 18 is a showing of the electrical interconnections to the memory to be employed with the circuit of FIG. 15;

FIG. 19 is a timing diagram for the "read" operation of the memory circuitry of FIG. 18;

FIG. 20 is a similar diagram for the "write" operation of the memory circuitry of FIG. 18;

FIG. 21 is a block diagram of a 16-bit computer processing unit employing four of the general purpose chips connected in parallel; and FIG. 22 is a block circuit diagram of another 16-bit computer processing unit which employs four sets of four general purpose chips arranged to increase the speed of operation of a computer circuit similar to that of FIG. 21.

Referring more particularly to the drawings, FIG. 1, as mentioned above, is a block diagram of the general purpose computer or logic chip. In the block diagram of FIG. 1, the principal circuits include the memory stack or file 32, the address generator 34 (also known as stack and file pointers or selectors) which is employed to select a particular location in the memory 32, and the arithmetic logic unit 36. The four registers 38, 40, 42, and 44, associated with the arithmetic logic unit 36 provide temporary operand storage for numbers being processed by the arithmetic unit 36 or which are involved in other logic processing or shifting operations. Incidentally, the small diamonds above and below the A register 38 and the Q register 44 indicate the shifting and/or transfer capabilities of these registers. Flexibility in processing binary numbers through the general purpose chip is facilitated by the "multiple multiplexing" circuits 46, 48, and 50. The inputs 52 and 54 each represent four lead buses carrying four bits of information in parallel. The micro-operation code input 56 includes eight inputs to the micro-operation code register 58. The output from the micro-operation code register 58 includes signals applied to the memory selector or pointer circuit 4 on leads 60, and signals applied to the control program logic arrays 62 on leads 64.

The block circuit diagram of FIG. 2 is more closely related to the actual chip configuration which is shown schematically in FIG. 3. Thus, al 42 of the input and output terminals to the chip are shown in FIG. 2. To relate the circuit of FIG. 2 to the more general block diagram of FIG. 1, it may be noted that the four input terminals 52 ae shown at the top of FIG. 2 to the left of center and the second set of four input terminals 54 are shown at the center top of FIG. 2. Similarly, the eight micro-operational code input terminals 56 appear at the left of FIG. 2, toward the bottom. The four output terminals 51 from the output multiplexer 50 are shown at the middle of the bottom of the circuit of FIG. 2.

concerning the other terminals shown in FIG. 2, which do not appear in FIG. 1, they include, for example, the two operation register control terminals 72. Signals applied to these terminals control the application of the operation control signals received at terminals 56, to the PLA control circuit 62, through the micro-operation register 58.

At the upper left of FIG. 2 is the reset terminal 74 which serves to reset the entire general purpose chip shown in FIG. 2 to a known state. The reset circuit 75, including a buffer, is connected to the reset terminal 74.

The program logic array circuitry 62 is clocked by signals applied to terminal 84. The output select terminals 86 and 88 select a particular set of signals within the general purpose chip to appear at the output leads 51, and a signal on an enable terminal 89 gates the selected output signal to these terminals. For example, they may route the signals applied to either set of input leads 52 or 54 directly to the output; alternatively, they may direct signals from one of the registers 42 or 44 associated with the arithmetic logic unit 36 to the output leads 51. The four terminals 90 are bi-directional shift terminals which route data serially in and out of the least significant or most significant digit positions of registers 42 and 44.

A clock input signal having a frequency of approximately 5 megacycles is applied to the terminal 76. The clock control terminal 78 is employed to gate the clock signal through the gate 80 to the remainder of the general purpose chip on lead 82. In passing, it should be noted that the PLA circuit 62 has its own clock input and therefore is not under the control of the clock control signals applied to the lead 82.

The three terminals 92, 94, and 96 at the lower right-hand corner of the diagram of FIG. 2 supply +12 volts, 5 volts and ground, respectively, to various logic circuits of the general purpose chip, as will be described in greater detail in connection with FIGS. 4A through 4B.

Concerning the remaining terminals, they constitute a first control terminal 98 and an enable control terminal 100 which operates through the multiplex circuit 102 to select single bits of information from various registers within the general purpose chip to be applied to terminal 98. The single bit control terminal 104 has signals applied to it under the control of multiplex gate 106. In general, it may be noted that control line 1 (terminal 98) provides single bit information, such as sign information, overflow information or the like; whereas the control line 2 connected to terminal 104 is a common control line interconnecting several general purpose chips.

The three remaining terminals 108, 110, and 112 relate to carries, with terminal 108 being the carry-in terminal; terminal 110 the carry output terminal, and terminal 112 the carry generate terminal. The multiplex gates 114 and 116, respectively, control carry signals applied to terminals 110 and 112.

Concerning other circuits which appear on FIG. 2 which are not shown in FIG. 1, there are a number of multiplex circuits which are associated with the various registers. Thus, for example, the T multiplex circuit 118 is associated with the T register 38, the Q multiplex gate circuit 120 is associated with Q register 42, and the A multiplex selection circuit 122 is associated with the A register 44.

In passing, it may be noted that the A register 44 and Q register 42 are employed in left and right shifting operations in conjunction with outputs from and inputs applied to terminals 90. The shift operations are indicated by double arrows to the Q multiplexer 120 and to the A multiplexer 122.

Incidentally, the additional multiplex circuit 124 designated the "L-MUX" provides a shift of one bit to the left going into the arithmetic logic unit 36, while "A-MUX" circuit 122 provides a right shift and is arranged to permit a shift to the right following arithmetic logic unit operations upon return of the data to the A register 44.

With reference to FIG. 3, this is a diagrammatic isometric view of an actual chip with very little detail included, merely to give some feel for the dimensions and the type of physical embodiment which is actually found when these chips are fabricated. More specifically, the chip measures approximately 170 mils by 170 mils and is approximately 25 mils thick, with one mil being equal to one-thousandth of an inch. The substrate 126 is made of sapphire (aluminum oxide) and has an original surface coating 128 of silicon which is approximately 10,000 angstroms thick, which is approximately 1/25 of a mil. The silicon is selectively etched away and treated in accordance with known techniques to provide complementary transistor geometry. This technology is discussed, for example, in the Sept. 25, 1972 issue of *ELECTRONICS*, at pages 113 through 116, as well as in the other references cited below. The metal terminals which appear around the periphery of the chip are approximately 1/25 of a mil or about 10,000 angstroms thick. Each terminal is approximately 4 mils by 4 mils in size. To give some idea of the area of chip taken up by various of the circuits shown in FIGS. 1 and 2, the program logic array control circuits 62 occupy approximately the area shown by the block 62' in FIG. 3; the stack file 32 of FIGS. 1 and 2 and the stack pointer 34 of FIG. 1 occupy the areas indicated by block 32' and 34', respectively, in FIG. 3. Output driver circuits 130 are of significant size to provide the necessary power for driving external circuits.

The clock control and driver circuitry appears at the right-hand corner of the chip of FIG. 3 and are identified by the reference numeral 80'. The operation register 58 of FIGS. 1 and 2 appears on the surface of the chip of FIG. 3 at area 58'.

The chip as shown in FIG. 3 has 45 terminals instead of the 42 shown in FIG. 2. The three extra terminals are accounted for by the additional ground terminal 96' and two test terminals 103 and 105.

With reference to FIGS. 4A through 4K (hereinafter referred to as FIG. 4), the terminals have been numbered to correspond with the terminals of FIGS. 1 and 2. Incidentally, the terminals 92, 94, and 96 representing the power connections, and the PLA clock terminal 84 do not appear in the logic circuit diagram of FIG. 4.

To continue development of the correspondence between the more generalized block diagrams of FIGS. 1 and 2 and the detailed logic circuit of FIG. 4, it may be noted that the PLA control circuit 62 of FIGS. 1 and 2 actually appears as three separate logic blocks 62A, 62B and 62C in the detailed logic circuit diagram of FIG. 4. In addition, the operation code register 58 appears at 58' in FIG. 4G. Also, the clock amplifier and control circuit 80 of FIG. 2 appears at 80' in FIG. 4G. The stack pointer 34' and the file pointer 34'' of FIG. 4B correspond to the blocks 32 of FIGS. 1 and 2.

The arithmetic unit 36' appears in the circuit of FIG. 4F and has associated with it the T register 38' and T register multiplex gate 118' of FIG. 4D. The other registers and gates associated with the arithmetic logic unit include the B register 40' and its associated multiplexer 48' of FIG. 4E; the Q register 42' of FIG. 4J and the associated multiplexer 120' of FIG. 4I; and the A register 44' and the related switching circuitry, which is divided into the associated following multiplexer circuitry 124' also in FIG. 4J and the left shifting input multiplexer 122' in FIG. 4I to the A register.

With regard to the Q register 42' and its associated multiplexing circuitry 120' it may be useful to note at this time the interconnections from the outputs of the individual registers of the multiplexer to the inputs of the gating circuitry. These include one set of leads which connect each register to both of its neighboring registers of greater and lesser significance. This permits left and right shifting of contents of the Q register under the control of the multiplexer. In such shifting operations, there would, of course, be one bit which would not be fed back to the Q register in the same chip. Such additional bits of information are routed to the bi-directional terminals 90', including the QSL and QSU terminals, associated with the Q register. These provide an input signal to one end of the Q register while concurrently routing the signal from the other end of the register to the adjacent chip. A similar arrangement is provided for the A register; however, in the case of the A register, the shifting path is somewhat more complex and involves either multiplexing circuit 124' or 122', with the multiplexing circuit 124' shifting digits to the left (toward increasing significance) prior to application to the arithmetic logic unit 36'. On the other hand, the "A-MUX" multiplexer 122' shifts digits to the right (or in the direction of lesser significance) prior to loading into the A register.

The multiplexing circuit 46' ("D-MUX") of FIG. 4H routes information from the file 32', from the arithmetic logic unit 36', or from either set of input leads 52' or 54' to selected registers.

The output multiplexing circuitry 50' appears at the lower right-hand side of FIG. 4, on the sheet designated FIG. 4J. Several of the output drivers 130' appear at the outpt of block 50'. These are the more powerful circuits to which attention was directed in connection with the showing of the chip of FIG. 3. The reset terminal 74' is connected to the circuitry 75' and 75'' at the lower left and right-hand side of the circuit of FIG. 4 on sheets 4G and 4J, respectively, and corresponds to the reset circuit 75 shown in FIG. 2.

The carry multiplex circuits 114' and 116' are shown associated with terminals 110' and 112' in FIG. 4C in a manner corresponding to the comparable showings in FIG. 2.

As mentioned above in the introduction of the present specification, two of the eight micro-operation code terminals 56 are termed "mode code" terminals and these two terminals are designated "M-1" and "M-2" in FIGS. 1, 2, and 4 of the drawings. As will be developed in greater detail below, when several of the general purpose chips are used together, the operation code signals applied to these two terminals M-1 and M-2, will modify the internal operation of the chips to determine significance of the data handled by the chip. Thus, for a 16-bit number, where four chips are employed to handle bytes of information involving four bits each, different signals are applied to the mode code terminals M-1 and M2 of the terminals 56 or the various chips. Thus, one of the four possible binary mode code signals would indicate to one of the four chips that it is handling the least significant byte of information; another code to another of the chips will indicate that this slected chip is handling the most significant byte of information; and the two chips representing intermediate significant information will both have the same mode code operation control signals applied to them. The fourth available mode code signal is employed to signify that a chip is not part of a group of chips handling multi-byte numbers.

More detailed consideration will now be given to the random access memory 32' of FIG. 4 (see FIG. 4C) and the associated file pointer circuitry 34' and the random access selector pointer 34'' (see FIG. 4B). With regard to the random access selector 34'', it includes a 4-bit register, specifically designated 142, 144, 146, and 148. The memory 32' has a capacity of sixteen 4-bit words or bytes. Each of these sixteen memory locations is uniquely identified or addressed by a 4-bit code. The 4-bit code address can be provided either by the stack pointer or selector 34' or by the file pointer or selector 34'', under the control of the file address multiplexer 150. The file address multiplexer 150 is controlled by input signals from the program logic array 62A to select either the address contained in the file pointer 34'' or that provided by the stack pointer or selector 34'.

The stack pointer or selector 34' is somewhat more complex than the file pointer 34'' in that it can be increment or decremented in accordance with the deired mode of operation. Thus, between the stack pointer registers 152 and the file address multiplexer circuit 150 is the incrementing circuit 154; and at the input to the stack pointer selector register 152 is the decrementing circuit 156.

These circuits permit easy and rapid entry of input data into successive address locations in the memory 32'. Thus, if the operator wishes to load successive registers of the memory 32', the stack pointer register 152 is successively incremented by energization of the incrementer 154. This allows successive entries of input information from leads 158 shown entering the upper side of the memory 32', as the address selection register 152 is incremented by circuit 154 and gated to select a desired byte register of the memory 32' by the file address multiplexer 150, to receive the byte of information from leads 158.

Similarly, information can be removed on a last-in, first-out basis by removing the information from the byte address location in the memory 32' which appears in register 152, and subsequently decrementing the address location as it is recirculated through decrementer 156 back to the register 152. In this manner, the information which was previously stored in successive locations in the memory circuit 32' may be removed from it on a last-in, first-out basis both conveniently and rapidly.

It may also be noted that, between successive uses of the file, and without disturbing the address in file selector registers 152, other sections of the memory 32' may be accessed by the random access register 142, 144, 146, and 148.

The circuit of FIGS. 4A through 4K includes a number of logic elements which can be implemented in accordance with a number of known technologies, but they are preferably implemented in terms of technology known as "Complementary Metal Oxide Semiconductors (CMOS)," and it has been determined that using silicon as a semiconductor material and sapphire or aluminum oxide as a substrate produces an advantageous and workable chip, and this silicon on sapphire structure is often abbreviated to "SOC." Suitable articles disclosing technology of this type include the following three references:

"CMOS," a publication dated December 1974 of Harris Semiconductor, a Division of Harris Corporation;

"Silicon-On-Sapphire Substrates Overcome MOS Limitations," by A. Karl Rapp and Edward C. Ross, *Electronics*/Sept. 25, 1972, pages 113–116; and "CMOS for General-Purpose Logic Design," by Kaare Karstad, *Computer Design*/May 1973, pages 99–106.

While a disclosure of specific circuit implementations of the various logic blocks shown in FIG. 4 should not be necessary to one skilled in the art, a detailed description of the principal logic blocks of FIG. 4 will now be undertaken, with a fairly detailed description being given of some of the initial transistor circuits, to indicate the principles of operation, and a less detailed description being sufficient for subsequently described logic circuits.

Reference will now be had to FIGS. 5A through 14B, which show the correspondence between the logic symbols employed in FIG. 4 and the actual transistor circuitry which appears on the chip. In general, as noted above, the circuitry is of the type known as "Complementary Metal Oxide Semiconductor (CMOS)" technology. Within the chip, the voltage levels shift between +12 volts and ground. In addition, the output drivers operate with three output levels to permit electrical connection between output terminals, without interference. The three levels would be either (1) low voltage, such as ground; (2) a high voltage, such as 5 or 12 volts, with 5 volts being selected for inter-chip compatibility and appearing at chip input and output terminals; and (3) a high impedance output, permitting the other outputs connected to the same electrical interconnection point to control the signal level. Applied to each chip in the system are three voltage levels, 12 volts, 5 volts and ground, as described in greater detail below.

FIG. 5A shows the symbol for an inverter. This is a triangle with a circle at the point of the triangle. The signal A at the input and the signal $\bar{A}$ at the output indicate that the signal applied to the input is inverted in passing through the circuit, with the inversion being indicated by the line or "bar" over the A, in accordance with conventional Boolean algebraic notation. In the present system, if the input signal is high (12 volts), the output signal would be low or very nearly equal to ground.

As noted above, FIG. 5B, and the other FIGURES having a B suffix through FIG. 14B are the transistor circuits, and may suitably be implemented by silicon on sapphire (SOS) complementary metal oxide semiconductor (CMOS) circuitry. The basic logic circuits using this type of technology are known in the art and are described, for example, in the Harris "CMOS" publication cited above. In MOS transistors the three electrodes are the gate, the source, and the drain. It is understood that the source and the drain are symmetrical, and that in a P-channel transistor, the source is normally connected to a more positive voltage than the drain; while with an N-channel transistor, the source is normally connected to a more negative voltage than the drain. In the notation used in FIGS. 5B through 14B, a P-channel MOS transistor is shown by a symbol similar to that normally used for a P-type transistor, with an inwardly directed arrow at the drain electrode. Instead of this showing, many workers in the field use a separate arrow between the source and drain electrodes, with an outwardly directed arrow indicating a P-channel MOS transistor and an inwardly directed arrow indicating an N-channel MOS transistor.

In FIG. 5B, the input is A and the output is $\bar{A}$, as in FIG. 5A. The actual circuit of FIG. 5B includes the P-channel transistor 162 and the N-channel transistor 164. A voltage S equal to +12 volts is applied to the drain electrode 166 of the P-channel transistor 162. The input A is connected to the gate electrodes of both the two transistors 162 and 164. The source electrodes of the two transistors are connected together to the output Q of the inverter circuit. The two values which input A may take are approximately +12 volts and approximately ground. When the input is at +12 volts, the N-channel transistor 164 is turned on and its impedance between source and drain drops to zero, and point $\bar{A}$ goes to ground. With the voltage at the gate and at the drain of P-channel transistor 162 both being approximately +12 volts, this transistor 162 is in a high impedance state between source and drain and does not affect the output at Q.

When input A is in its other state, at approximately ground potential, the gate and drain voltages at the N-channel transistor 164 are both approximately equal to ground and it is in the off state, presenting a high impdance between drain and source. P-channel transistor 162, however, is turned on, giving a low impedance from drain to source of transistor 162 and raising output Q to the 12-volt level of drain electrode 166 of transistor 162. Accordingly, the output Q in each case is the inverted value of input A, and is therefore equal to $\overline{A}$.

Incidentally, for completeness, the following operating parameters of transistors of the present type (in the enhancement mode) should be noted. Specifically, N-channel transistors are generally turned off when the voltage on both the gate and drain electrodes is ground or a negative voltage, such as −12 volts, but are in the conducting state when a positive voltage, such as +12 volts, is applied to both the gate and drain electrodes. Inversely, P-channel transistors are "on" when ground voltage is applied to both the gate and the drain electrodes and when a negative 120 volts is applied to both of these electrodes. On the other hand, P-channel transistors are in the "off" state when +12 volts is applied to both the gate and drain electrodes.

FIG. 6A shows the logic circuit for a NAND gate, and FIG. 6B shows the transistor circuit for the implementation of the NAND gate. As is well known to those skilled in the art, an AND gate provides an output signal only when both of the two input signals are equal to a binary 1, and does not give an ouptut signal when either or both of the input signals are equal to a binary 0. In Boolean algebraic terms, the equation of the circuit is $Q = A.B$. The circuit of FIGS. 6A and 6B is not an AND gate but is a NAND gate. This means that the output has a value equal to the output of an AND circuit, which has been inverted. Accordingly, when an AND gate would give a 1 output, a nand gate would give a 0 output, and vice versa. The Boolean algebraic equation for a NAND circuit is $Q = \overline{A.B}$.

In the present circuitry, within the chip, a binary 1 is represented by +12 volts and a binary 0 is represented by a low voltage or a voltage at ground level. Accordingly, in the circuits of FIGS. 6A and 6B, when and only when both input A and input B are at +12 volts, each representing a binary 1, will output Q represent a binary 0 and be at ground potential. If either input A or input B is at a low level or at ground potential, representing a 0, then will represent a binary 1 and have an output level of +12 volts.

In considering how the circuit of FIG. 6B provides this result, note that if A and B are both energized at the +12 volt level, the P-channel transistors 168 and 170 will be turned off, as they have the same +12 -volt potential across gate and drain; and both transistors 172 and 174 will be turned on as these N-channel transistors have a positive voltage from gate to drain. Output lead Q will therefore drop to ground potential and is isolated from the +12 -volt source.

Incidentally, in connection with the conventions used in the present circuit showings, electrical connection of intersecting leads are shown by dots, and where there is no dot at intersecting leads there is no electrical connection. In addition, when a lead is shown extending directly through a transistor as in the case of the input lead B extending through transistor 174, this is a direct connection from the gate electrode to the lead on the other side of the transistor. Accordingly, input B is directly connected to the gate electrode of transistor 170 in FIG. 6B.

Note further in FIG. 6B, that when either input A or input B is at ground potential, one or the other of transistors 168 or 170 will be turned on, and at least one of transistors 172 and 174 will be turned off, so that output Q is raised to the +12-volt potential of source S.

Considering FIGS. 7A and 7B, they represent a NOR gate. An OR gate provides an output binary 1, if either or both of the inputs is a binary 1. This is represented in Boolean algebraic terms by the equation $Q = A + B$. The NOR gate has an output equal to that of an OR gate, inverted. Thus, the output of a NOR gate is a 0, if either or both of the inputs is a 1 and is a 1 only if both of the inputs are 0. The equation for a NOR gate, as indicated in FIG. 7B, is $Q = \overline{A + B}$.

To indicate how the foregoing mode of operation is implemented by FIG. 7B, note that the output Q should be 12 volts only if both input A and input B are at ground potential. If the inputs are at this ground level, p-channel transistors 176 and 178 will both be turned on, raising Q to the 12-volt potential of source S. Also, ground potential will be applied to the gate electrodes of both N-channel transistors 180 and 182, and with ground potential across the gate-to-drain electrodes, these N-channel transistors will both be turned off, isolating output Q from ground.

FIGS. 8A and 8B represent an exclusive OR gate. This circuit provides an output binary 1 when one and only one of the two inputs is in the 1 state. It will provide a binary 0 as an output if both of the inputs are 1, or if both are 0. As shown on the drawing, the Boolean algebraic equation for this function is $Q = \overline{A}.B + A.\overline{B}$.

In considering how the circuit of FIG. 8B implements the exclusive OR function, note that the output of inverter 184 is $\overline{A}$, the inverted value of A. In addition, input B is applied to the gate electrodes of both transistors 188 and 190, while input A is applied to the source electrode of transistor 190, in addition to the input to the inverter 184.

The detailed mode of operation of the circuit of FIG. 8B is apparent from Exclusive OR Table set forth below which indicates the state of the voltages at the input and at the output, as well as the condition of the transistors 188 and 190.

Exclusive OR Table (FIG. 8B)

| INPUTS (BINARY SYMBOLS) | | VOLTAGE INPUTS | | INVERTER 184 OUTPUT "$\overline{A}$" | | TRANSISTOR STATUS | | OUTPUT Q | |
|---|---|---|---|---|---|---|---|---|---|
| A | B | A | B | (Binary) | Voltage | 188 | 190 | Boolean | Volts |
| 1 | 0 | 12v | gnd | 0 | gnd | off | on | 1 | 12 |
| 0 | 1 | gnd | 12v | 1 | 12v | on | off | 1 | 12 |
| 1 | 1 | 12v | 12v | 0 | gnd | on | off | 0 | gnd |
| 0 | 0 | gnd | gnd | 1 | 12v | off | on | 0 | gnd |

The so-called D flip-flop of FIGS. 9A and 9B serves to provide an output which follows input D when clock signals are applied on the common lead to the gate electrode of N-channel transistor 192 and P-channel transistor 194 of the circuit of FIG. 9B. A high or 12-volt input signal applied on the reset lead to transistor 196, however, will turn this transistor on and block the output to lead Q. The two inverters 198 and 202 together with the feedback resistor 204 serve to amplify and lock up the output signal as long as the D input and the clock input are present and there is no reset signal applied.

FIGS. 10A and 10B show an output driver circuit, which is also an inverter. In FIG. 10B the output Q appears at terminal 208 which is represented by a rectangle to indicate that it is one of the actual output terminals of the chip.

Signals to and from the general purpose chip organized in accordance with the present invention are at a 5-volt level rather than the 12-volt level which is employed within the chip. Signals applied at input A to the output driver and to the source electrode of transistor 210 are at a +12-volt and at ground level to indicate a binary 1 or 0, respectively. Other elements of the circuit of FIG. 10B include the two inverters 212, 214, and the feedback resistor 218. When input A is high at the 12-volt level, transistor 210 is turned on, the output from inverter 212 is low and that from inverter 214 is high. With gate electrode of transistor 220 at a more positive potential of 12 volts than the +5 voltage level at the source electrode 222 of transistor 220, this transistor is turned off. With +12 volts being applied to the gate and round to the source electrode of transistor 224, this N-channel transistor will be "on." With the transistor 224 "on," ground will be applied to the input to inverter 216 and 12 volts is applied from the output of inverter 216 to the gate electrode of N-channel transistor 226. This will energize transistor 226 and output Q will drop to ground potential, thus providing the indicated inversion.

Similarly, when input A drops to ground potential, the states throughout the circuit will be substantially reversed with transistor 220 being on and transistor 226 being off, and output Q at terminal 208 will rise to the +5-volt level applied to the source electrode 222 of transistor 220.

FIGS. 11A and 11B are similar to FIGS. 10A and 10B, with the exception that an additional "enable" lead 230 has been added. When +12 volts are applied to the enable lead 230, the operation of the output circuit is as described above in connection with FIGS. 10A and 10B; however, when the enable 230 lead is grounded, a high impedance output appears at terminal 228 regardless of the input D applied to transistor 210.

More specifically, when the enable input 230 is at +12 volts, control transistors 230 and 231 both have 12 volts applied between the drain and gate electrodes, and these P-channel transistors are therefore turned off. Accordingly, the entire enable circuits does not affect the operation of the remainder of the circuit, and it operates in response to the changes of D signals exactly as does FIG. 10B.

However, when round is applied to the enable lead 230, transistors 231 and 232 are energized. Considering the circuitry associated with control transistor 232, the source electrode 232 at input inverter 216′ rises to 12 volts, the output of inverter 216′ applied to gate electrode of transistor 226 is at ground potential and N-channel transistor 226′ is turned off. Considering control transistor 231, its source electrode also rises to +12 volts providing a low output from inverter 212′ and a +12 voltage output from inverter 214′. With +12 volts at the gate electrode of transistor 220′, this P-channel transistor is also turned off. With the two output transistors 220′ and 226′ both deenergized, a high output impedance appears at terminal 228. This high output impedance permits the direct connection of several output terminals with the output potential determined by signals from other sources, as long as ground potential is applied to the enable lead 230.

FIGS. 12A and 12B show a two-state circuit which provides both an output Q which follows the input, and the inverted or negated value of the output Q designated $\overline{Q}$. The circuit of FIG. 12B includes the two inverters 234 and 236 together with the feedback resistor 238. The output Q follows the input A; and the circuit provides improved rise time of the binary output signals and voltage level "clean-up."

FIGS. 13A and 13B are similar to the circuit of FIGS. 9A and 9B and operate in much the same manner. The output $\overline{Q}$ is the inverse of 5-volt input D, which appears at terminal 240. To obtain the transformation from the 5-volt level at input terminal 240 to the desired 12-volt output at $\overline{Q}$, both the clock and the negated value of the clock are employed, with the clock being inverted by circuit 242. The balance of the negating circuitry is conventional and follows principles outlined above.

The circuit of FIGS. 14A and 14B is even closer to the circuit of FIGS. 9A and 9B than the circuit of FIGS. 13A and 13B. However, in FIGS. 14A and 14B, input B at terminal 244 is at a 5-volt leve. Input A and reset input R are at the conventional 12-volt or ground levels employed in the chip. Output Q follows input B at terminal 244 in the absence of a reset signal on lead R.

In reviewing the circuits of FIGS. 5A through 14B, several points may be noted. First, where terminals are shown in the circuits having a B suffix this indicates that the voltage swings are between +5 volts and ground, as compared with +12 volts and ground for circuits wholly within the chip. In addition, the small circles, for example, see FIGS. 5A and 6A, represent an inversion. Thus, the symbol of FIG. 6A without the circle would represent an "AND" gate, and that of FIG. 7A without the circle would represent an "OR" gate. In some cases where the binary 1 is represented by a ground or low level signal it is useful in the logic circuit of FIGS. 4A through 4K to indicate the inversion at the input to the "AND" or "OR" gates by circles at the points where the input lines meet the "AND" or "OR" gate symbol. The implementation of such logic functions is conventional and may take any of a number of forms of the type described hereinabove in connection with FIGS. 5A through 14B.

FIG. 15 is a block diagram of a "minimal computer system" which employs two of the general purpose chips in the arithmetic logic unit, and two additional general purpose chips in the micro-code control portion of the computer. The computer handles 8-bit words, with each of the two chips in the arithmetic logic unit section of the computer handling one byte of four bits.

Referring more particularly to FIG. 15, the arithmetic logic unit 252 is, as noted above, made up of two general purpose chips. Similarly, the micro-code sequence control circuit 254 includes two of the general purpose chips. The other circuits shown as blocks in FIG. 15 include the micro-code control memory 256 and a random access memory 258.

In the circuit of FIG. 15, the common timing input is provided on lead 260. The line 262 represents an 8-bit common two-way bus, which in practice would include eight separate conductors. As indicated in the drawings, eight bits of information can be transmitted from the common bus 262 to the arithmetic logic unit 252 over bus 264; and back from the arithmetic logic unit 252 to the bus 262 via bus 266. The micro-code sequence control are applied from the micro-code control memory 256 to the arithmetic logic unit 252 over the bus 268 which includes eleven conductors for applying eleven inputs to the two chips. Similarly, eleven micro-code sequence control inputs are applied from unit 256 to circuitry 254 over bus 270. Micro-instructions are supplied from the external memory 258 to the micro-code sequence controller 254 over the 8-bit bus 272. The 2-bit bus 274 controls the functions of the random access memory 258. The 8-bit bus 276 addresses the micro-code memory 256.

FIG. 16, made up of sheets 16A and 16B, shows a first general purpose computer chip 278 and a second general purpose chip 280. The chips 278 and 280 are interconnected identically for use in the implementation of the arithmetic logic unit 252 of FIG. 15 and for the implementation of the micro-code sequence control 254. However, of course, the inputs applied to the various connections are entirely different. More specifically, the lads 268' and 270' coming in from the bottom of the circuit of FIG. 16B represent bus 268 and bus 270, respectively, associated with the arithmetic logic unit 252 and micro-code control circuit 254 of FIG. 15. Different signals are applied over leads 268 and 270 for the necessarily different control of the arithmetic logic unit 252 and the micro-code sequence control 254. Subsequently in the present description, the micro-code memory output bit pattern on the various leads are identified by numbers 0 through 10 for the eleven inputs to the micro-code sequence controller 254 and by bit numbers 11 through 21 for the eleven inputs to the two arithmetic logic unit chips 252.

Concerning other sets of leads which appear in the circuit of FIG. 16, it may be noted that the leads entering from the upper left of the drawings are connected to the common two-way bus 262' corresponding to line 262 of FIG. 15. At the upper right-hand side of FIG. 16 are eight leads 266', 276'. These designations refer to the output connection 266 from arithmetic logic unit 252 to the common bus 262 in FIG. 15 and the output 276 from the micro-code controller 254 to the micro-code memory 256. As indicated in FIG. 16, four of the eight leads making up bus 266', 276' come from one of the general purpose chips and the four other leads come from the other general purpose chip. It may be also noted in FIG. 15 that two input buses 282 and 284 to blocks 252 and 254, respectively, are not used. The eight inputs leads from the left in FIG. 16, designated 282', 284' represent unused input terminals of the chips and correspond to input buses 282 and 284.

Certain interconnections between the two general purpose chips 276 and 280 should also be noted. These include the bi-directional shift lines. Another interconnection is the carry generate leads 294. An additional common control line 296, also designated CTL-2, for control line 2, interconnects chips 270 and 280. A single bit of control information common to the devices are presented on this line. This information is used, for example, in multiplying, dividing, and a number of other operations. The information on control line 2 originates in one of the general purpose chips and is applied to all of them.

FIG. 17 shows the connections between the common bus 262 and the two chips 252 making up the arithmetic logic unit and the two chips 254 making up the micro-code sequence controller 254. The common bus 262' is shown by the eight vertical lines in FIG. 17. The bus 298' connects the common bus to the external memory circuit 258 of FIG. 15. Inputs and outputs to the arithmetic logic unit 252 are shown by buses 264' and 266', respectively, corresponding to buses 264 and 266 in FIG. 15. The inputs 272' to the micro-code sequence controller 254 appear at the lower left in FIG. 17. In passing, it may be noted that there is no return bus from the micro-code sequence controller 254 to the common bus as it is connected via bus 276 to the micro-code memory unit as shown in FIG. 15.

A detailed description of the mode of operation of the circuit of FIG. 15 using four general purpose chips of the type described in FIGS. 1 through 4 will now be presented. This example will show how the chips operate and how they are controlled when the arithmetic logic unit is initially reset to the zero state or to its initial state, and pre-selected 16-bit number is repetitively added. It may be noted that the circuit of FIG. 15 only includes two chips in the arithmetic logic unit, each capable of operating only four bits at a time. Accordingly, the two ship arithmetic logic unit 252 would normally handle 8-bit additions, substractions, multiplications and the like. In the present example, however, in order to more fully demonstrate some of the capabilities of the circuit, 16-bit numbers are being processed, necessitating certain holding and program techniques illustrating in some small degree the flexibility of the general purpose chip.

To focus attention on the key portions of the general purpose chip which will be used in the present example, the A register and the B register associated with the arithmetic logic unit 36 of FIGS. 1, 2, and 4 will be used to hold the operands. The cumulative sum of successive numbers which are added together will be stored in register locations 8 and 9 in the file 32 of FIGS. 1, 2, and 4. In the course of processing numbers, file locations 0 and 1 will also be employed. It may be noted that, using file locations 8 and 9, with two chips, a total of sixteen bits may be stored, corresponding to the double precision addition which is being accomplished in the present example. For the purposes of the present example, the overflow from the most significant digit is not being retained; however, by suitable programming this overflow could be stored in an additional register.

Considering the initial conditions of circuit 15 when the present example is undertaken, the external memory store 258 includes the 16-bit constant in two 8-bit memory locations. In addition, it includes a transfer address instruction. This initial state of the external memory store 258 may be indicated by the following Table.

TABLE I

| DATA IDENTIFICATION | ADDRESS | DATA |
|---|---|---|
| First Constant | 0 | $K_1$ |
| Second Constant | 1 | $K_2$ |
| Transfer Address | 2 | 4 |

Now, turning to the example itself, it includes four initial steps, and seventeen addition re-cycling steps, for a total of twenty-one operational steps in the program. These steps are indicated sequentially in the following table.

lowing description we will consider what each stem means and the function of the sytem itself. Concerning the 0 step, the number is loaded into the file pointer

TABLE II

| STEPS | MICRO-CODE CONT. SEQ. | ALU SEQUENCE |
|---|---|---|
| (0) | A + 1 → A | A OUTPUT <8> → FP |
| (1) | A + 1 → A | A OUTPUT A → M<FB> |
| (2) | A + 1 → A | A OUTPUT <9> → FB |
| (3) | A + 1 → A | A OUTPUT A → M<FP> |
| ↓ | | |
| (4) | A + 1 → A | A OUTPUT <8> → FP |
| (5) | A + 1 → A | A OUTPUT 0 → A |
| (6) | A + 1 → A | A OUTPUT NO-OP |
| (7) | A + 1 → A | A OUTPUT A → OUTPUT, DATA READ, A + 1 → M<SP +1>, INI → A, SP + 1 → SP |
| (8) | A + 1 → A | A OUTPUT M<FP> → B |
| (9) | A + 1 → A | A OUTPUT A + B → A, C |
| (10) | A + 1 → A | A OUTPUT A → M<FP> |
| (11) | A + 1 → A | A OUTPUT M<SP> → A, SP − 1 → SP |
| (12) | A + 1 → A | A OUTPUT NO-OP |
| (13) | A + 1 → A | A OUTPUT A → OUTPUT, READ DATA, A + 1 → M<SP + 1>, INI → A, SP + 1 → SP |
| (14) | A + 1 → A | A OUTPUT <9> → FP |
| (15) | A + 1 → A | A OUTPUT M<FP> → B |
| (16) | A + 1 → A | A OUTPUT A + B + C → A, C |
| (17) | A + 1 → A | A OUTPUT A → M<FP> |
| (18) | A + 1 → A | A OUTPUT M<SP> → A, SP − 1 → SP |
| (19) | A + 1 → A | A OUTPUT NO-OP |
| (20) | INI → A | A OUTPUT A → OUTPUT, DATA READ, NO-OP |
| (21) | A + 1 → A | A OUTPUT NO-OP |
| ↓ | | |
| (4) | A + 1 → A | A OUTPUT <8> → FP |
| RESET | O → A, O → SP, O → OCR | O → A, O → SP, O → OCR |

In table II the left column indicates the steps with steps 0 through 3 being for start-up, and steps 4 through 21 being the steps which are involved in successive additions in the 16-bit number made up of K-1 and K-2, in the arithmetic logic unit. The notation is in accordance with Appendix III which follows the body of this specification.

Prior to step 1, the "reset" step involves the application of a signal to terminal 74 of the chip, which resets the A register to 0, resets the stack pointer to 0, and also resets the operation code registers (OCR) to 0. It is again pointed out that the entire left-hand side of Table II involves operations within the micro-code controller and the entire right-hand side of Table II involves the sequence in the arithmetic logic unit.

Concerning the sequence within the micro-code controller, it is relatively simple. Essentially, it involves the incrementing of the A register from 0 up to 21 and then skipping back to 4. This skipping back to step 4 involves the actuation of the micro-code memory unit 256 of FIG. 15, and the withdrawal of information from external memory 258 as stored in memory location 2 as indicated in Table I. Incidentally, the incrementing of the micro-code controller is accomplished under the control of memory 256 but this instruction is the same for steps 0 through 20 of the program and only gives the instructions to the micro-code controller 254 to skip to the sequence step read from the external memory 258 from step 21. The actual command for transfer is given in step 20 because of the delay in accomplishing the step until the next following computer time period.

Of course, referring to FIG. 15, as the A register is incremented, the address represented by its contents is fed on bus 276 to the micro-code memory 256, and micro-code instructions are applied to each chip over bus 268 for the arithmetic logic unit, and over bus 270 for the micro-code sequence controller chips 254.

With regard to the significance of the successive steps in the arithmetic logic unit sequence, in the following description we will consider what each stem means and the function of the sytem itself. Concerning the 0 step, the number is loaded into the file pointer (FP), and it replaces the contents of the file pointer register 34'' in the individual registers 142, 144, 146, and 148 (see FIG. 4B). The number 8 was used arbitrarily as a higher numbered memory location in the memory 32, as some of the lower numbered locations may be employed in other operations. In step 1 the contents of the A register are loaded and replace the contents of memory 32' of the file in the memory location 8, indicated by the file pointer selector register 34''. Incidentally, the contents of the A register are 0 so the location in the file 32' is thus also reset to correspond with the O state of the A register.

In steps 2 and 3, step 0 and 1 are duplicated for stack position 9 of the memory or stack 32'. In step 4, the file pointer is loaded with the identification of register 8. In step 5, the number 0 is loaded into the A register. In step 6 no operation takes place, this step being included for timing purposes. In step 7, the contents of the A register which is 0 is presented on the common bus 262; and the random access external memory 258 is placed on the read mode, and reads the address location O which has been presented by the A register on bus 262; the contents of the A register are incremented and stored in the memory 32' at the location specified by the stack pointers 34' contents plus one, and input No. 1 from the external store 258 (FIG. 15) address 0 is loaded into the A register from the bus 262. Register A now contains K-1 from the external memory 258. Incidentally, this does not occur until the next clock period during step 8 in response to the prior address provided during step 7 to external memory 258. The stack pointer register 152 in stack pointer selector 34' is loaded with the incremented stack pointer plus on (SP + 1) value.

Incidentally, with regard to sequences in Table II, the indicated steps normally represent commands and these are generally not implemented until the next subsequent step or clock period; however, outputs such as the output from Register A in step 7 does occur immediately. Step 8 involves the loading of the contents of memory 32' indicated by the file pointer 34" into register B. In step 9, the contents of registers A and B are added and loaded into register A and the carry is saved in the T register. In step 10, the contents of register A are then returned to memory 32' at the location indicated by the file pointer 34" (location 8). In step 11, the contents of the memory 32' at the location indicated by stack pointer 34' are loaded into register A. The stack pointer is then decremented by 1.

Looking at the steps which are being accomplished from a somewhat more general basis, it may be noted that the stack pointer or selector 34' is being employed to identify the addresses of the external memory which are being used, and the file pointer 34' is being employed to identify the locations in memory 32' containing the data which is being processed. Incidentally, the stack pointer or selector is operating with locations 0, 1, and 2 of the memory 32', while the file pointer 34' is using memory locations 8 and 9 to store the intermediate results from the double length (16-bit) addition operation.

Returning to the successive program steps, in step 12 no operation actually takes place, for timing purposes. In step 13, the external memory is being addressed with memory location 1 and the constant K-2 will, during the next step, be read back into the A register. In addition, the stack pointer 34' is being incremented.

In accordance with tep 14, the number 9 is placed in file pointer 34". Step 15 loads the contents of register 9 as selected by the file pointer into the B register. In step 16, the contents of registers A and B and the carry (from the T register) are added and placed in the A register, with the carry again being saved (in the T register). Per step 17, the contents of register A are then returned to location 9 of memory 32" which now contains the most significant portion of the 16-bit accumulation. The next steps of the program are decided to transfer micro-code controller to step 4. The specific steps required to accomplish this include step 18 which transfers the contents of the memory at the location indicated by stack pointer 34' to register A (the contents are address 2 for memory 258). In addition, in stem 18, the stack pointer is decremented and stored in stack pointer register 152. Step 19 is not on operation, for timing purposes. In step 20, the output of the A register is placed on the common bus 262 and read by the external memory 258 to prepare for a return of the micro-code controller 254 to step 4, by micro-instructions from memory 258 on lead 272. The entire process in then repeated with the constants $K_1$ and $K_2$ being continually added and accumulated.

Table III shows the contents of the A register 44 and the B register 40 associated with the arithmetic logic unit during steps 1 through 21; and also indicates the nuber in the stack pointer 34' and the file pointer 34" associated with the memory 32', as well as the contents of memory locations 8 and 9.

Table IV shows the detailed 8-bit address codes applied by the micro-code sequence controller 270 over bus 276 to the micro-code memory 256; and Table IV also shows the resultant 11-bit code applied to arithmetic logic unit 252 (Field B) and to the micro-code sequence controller 254 (Field A).

TABLE III

ALU REGISTER AND MEMORY CONTENTS DURING SAMPLE μ-PROGRAM (first iteration)

| STEP (μA) | REG. A | REG. B | FP | SP | M<8*> | M<9> | M<1> |
|---|---|---|---|---|---|---|---|
| (0) | 0 | X** | X | 0 | X | X | X |
| (1) | 0 | X | X | 0 | X | X | X |
| (2) | 0 | X | 8 | 0 | X | X | X |
| (3) | 0 | X | 8 | 0 | 0 | X | X |
| →(4) | 0 | X | 9 | 0 | 0 | X | X |
| (5) | 0 | X | 9 | 0 | 0 | 0 | X |
| (6) | 0 | X | 8 | 0 | 0 | 0 | X |
| (7) | 0 | X | 8 | 0 | 0 | 0 | X |
| (8) | 0 | X | 8 | 0 | 0 | 0 | X |
| (9) | $K_1$ | X | 8 | 1 | 0 | 0 | 1 |
| (10) | $K_1$ | [M<8>] | 8 | 1 | 0 | 0 | 1 |
| (11) | $K_1$+[M<8>] | [M<8>] | 8 | 1 | 0 | 0 | 1 |
| (12) | $K_1$+[M<8>] | [M<8>] | 8 | 1 | $K_1$+[M<8>] | 0 | 1 |
| (13) | 1 | [M<8>] | 8 | 0 | $K_1$+[M<8>] | 0 | 1 |
| (14) | 1 | [M<8>] | 8 | 0 | $K_1$+[M<8>] | 0 | 1 |
| (15) | $K_2$ | [M<8>] | 8 | 1 | $K_1$+[M<8>] | 0 | 2 |
| (16) | $K_2$ | [M<8>] | 9 | 1 | $K_1$+[M<8>] | 0 | 2 |
| (17) | $K_2$ | [M<9>] | 9 | 1 | $K_1$+[M<8>] | 0 | 2 |
| (18) | $K_2$+[M<9>]+C | [M<9>] | 9 | 1 | $K_1$+[M<8>] | 0 | 2 |
| (19) | $K_2$+[M<9>]+C | [M<9>] | 9 | 1 | $K_1$+[M<8>] | $K_2$+[M<9>]+C | 2 |
| (20) | 2 | [M<9>] | 9 | 0 | $K_1$+[M<8>] | $K_2$+[M<9>]+C | 2 |
| └(21) | 2 | [M<9>] | 9 | 0 | $K_1$+[M<8>] | $K_2$+[M<9>]+C | 2 |
| (4) (NEXT) | 2 | [M<9>] | 9 | 0 | $K_1$+[M<8>] | $K_2$+[M<9>]+C | 2 |
| (5) (NEXT) | 2 | [M<9>] | 9 | 0 | $K_1$+[M<8>] | $K_2$+[M<9>]+C | 2 |
| (6) (NEXT) | 2 | [M<9>] | 8 | 0 | $K_1$+[M<8>] | $K_2$+[M<9>]+C | 2 |
| (7) (NEXT) | 0 | [M<9>] | 8 | 0 | $K_1$+[M<8>] | $K_2$+[M<9>]+C | 2 |
| (8) (NEXT) | 0 | [M<9>] | 8 | 0 | $K_1$+[M<8>] | $K_2$+[M<9>]+C | 2 |
| (9) (NEXT) | $K_1$ | [M<9>] | 8 | 1 | $K_1$+[M<8>] | $K_2$+[M<9>]+C | 1 |
| ↓ | ↓ | ↓ | ↓ | ↓ | ↓ | ↓ | ↓ |

*ALL NUMBERS IN DECIMAL **(X) DON'T CARE OR DON'T KNOW

TABLE IV

| DECIMAL (BASE 10) RESET | μ-CODE MEMORY (256) ADDRESS INPUT — BINARY Bit Numbers 7 | 6 | 5 | 4 | 3 | 2 | 1 | 0 | μ-CODE CONTROL MEMORY CONTENTS / μ-CODE MEMORY (256) DATA OUTPUT — "A" FIELD to μ-CODE SEQ.CON. 254 — 0 | 1 | 2 | 3 | 4 | 5 | 6 | 7 | 8 | 9 | 10 | 11 | "B" FIELD to ALU 252 — 12 | 13 | 14 | 15 | 16 | 17 | 18 | 19 | 20 | 21 | "C" FIELD MEMORY CONTROL — 22 R | 23 W |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 1 | 0 | 1 | 1 | 1 | 0 | 0 | 1 | 1 | 1 | 1 | 1 | X* | X | 0 | 0 | 1 | 1 | 1 | 0 | 0 | 0 | 0 | 0 |
| 1 | 0 | 0 | 0 | 0 | 0 | 0 | 0 | 1 | 1 | 0 | 1 | 1 | 1 | 0 | 0 | 1 | 1 | 1 | 1 | 1 | X | X | 0 | 1 | 0 | 1 | 1 | 1 | 0 | 1 | 0 | 0 |
| 2 | 0 | 0 | 0 | 0 | 0 | 0 | 1 | 0 | 1 | 0 | 1 | 1 | 1 | 0 | 0 | 1 | 1 | 1 | 1 | 1 | X | X | 0 | 0 | 1 | 1 | 1 | 0 | 0 | 1 | 0 | 0 |
| 3 | 0 | 0 | 0 | 0 | 0 | 0 | 1 | 1 | 1 | 0 | 1 | 1 | 1 | 0 | 0 | 1 | 1 | 1 | 1 | 1 | X | X | 0 | 1 | 0 | 1 | 1 | 1 | 0 | 1 | 0 | 0 |
| 4 | 0 | 0 | 0 | 0 | 0 | 1 | 0 | 0 | 1 | 0 | 1 | 1 | 1 | 0 | 0 | 1 | 1 | 1 | 1 | 1 | X | X | 0 | 0 | 1 | 1 | 1 | 0 | 0 | 0 | 0 | 0 |
| 5 | 0 | 0 | 0 | 0 | 0 | 1 | 0 | 1 | 1 | 0 | 1 | 1 | 1 | 0 | 0 | 1 | 1 | 1 | 1 | 1 | X | X | 0 | X | 0 | 0 | 1 | 1 | 1 | 0 | 0 | 0 |
| 6 | 0 | 0 | 0 | 0 | 0 | 1 | 1 | 0 | 1 | 0 | 1 | 1 | 1 | 0 | 0 | 1 | 1 | 1 | 1 | 1 | X | X | 0 | X | 0 | 0 | 0 | 0 | 0 | 0 | 0 | 0 |
| 7 | 0 | 0 | 0 | 0 | 0 | 1 | 1 | 1 | 1 | 0 | 1 | 1 | 1 | 0 | 0 | 1 | 1 | 1 | 1 | 1 | 0 | 1 | 1 | 1 | 0 | 0 | 1 | 1 | 0 | 0 | 1 | 0 |
| 8 | 0 | 0 | 0 | 0 | 1 | 0 | 0 | 0 | 1 | 0 | 1 | 1 | 1 | 0 | 0 | 1 | 1 | 1 | 1 | 1 | X | X | 0 | 1 | 0 | 1 | 0 | 0 | 1 | 1 | 0 | 0 |
| 9 | 0 | 0 | 0 | 0 | 1 | 0 | 0 | 1 | 1 | 0 | 1 | 1 | 1 | 0 | 0 | 1 | 1 | 1 | 1 | 1 | X | X | 0 | 1 | 0 | 1 | 1 | 0 | 1 | 1 | 0 | 0 |
| 10 | 0 | 0 | 0 | 0 | 1 | 0 | 1 | 0 | 1 | 0 | 1 | 1 | 1 | 0 | 0 | 1 | 1 | 1 | 1 | 1 | X | X | 0 | 1 | 0 | 1 | 1 | 1 | 0 | 1 | 0 | 0 |
| 11 | 0 | 0 | 0 | 0 | 1 | 0 | 1 | 1 | 1 | 0 | 1 | 1 | 1 | 0 | 0 | 1 | 1 | 1 | 1 | 1 | X | X | 0 | 1 | 0 | 0 | 1 | 0 | 1 | 0 | 0 | 0 |
| 12 | 0 | 0 | 0 | 0 | 1 | 1 | 0 | 0 | 1 | 0 | 1 | 1 | 1 | 0 | 0 | 1 | 1 | 1 | 1 | 1 | X | X | 0 | X | 0 | 0 | 0 | 0 | 0 | 0 | 0 | 0 |
| 13 | 0 | 0 | 0 | 0 | 1 | 1 | 0 | 1 | 1 | 0 | 1 | 1 | 1 | 0 | 0 | 1 | 1 | 1 | 1 | 1 | 0 | 1 | 1 | 1 | 0 | 0 | 1 | 1 | 0 | 0 | 1 | 0 |
| 14 | 0 | 0 | 0 | 0 | 1 | 1 | 1 | 0 | 1 | 0 | 1 | 1 | 1 | 0 | 0 | 1 | 1 | 1 | 1 | 1 | X | X | 0 | 0 | 1 | 1 | 1 | 0 | 0 | 1 | 0 | 0 |
| 15 | 0 | 0 | 0 | 0 | 1 | 1 | 1 | 1 | 1 | 0 | 1 | 1 | 1 | 0 | 0 | 1 | 1 | 1 | 1 | 1 | X | X | 0 | 1 | 0 | 1 | 0 | 0 | 1 | 1 | 0 | 0 |
| 16 | 0 | 0 | 0 | 1 | 0 | 0 | 0 | 0 | 1 | 0 | 1 | 1 | 1 | 0 | 0 | 1 | 1 | 1 | 1 | 1 | X | X | 0 | 0 | 0 | 1 | 1 | 0 | 1 | 1 | 0 | 0 |
| 17 | 0 | 0 | 0 | 1 | 0 | 0 | 0 | 1 | 1 | 0 | 1 | 1 | 1 | 0 | 0 | 1 | 1 | 1 | 1 | 1 | X | X | 0 | 1 | 0 | 1 | 1 | 1 | 0 | 1 | 0 | 0 |
| 18 | 0 | 0 | 0 | 1 | 0 | 0 | 1 | 0 | 1 | 0 | 1 | 1 | 1 | 0 | 0 | 1 | 1 | 1 | 1 | 1 | X | X | 0 | 1 | 0 | 0 | 1 | 0 | 1 | 0 | 0 | 0 |
| 19 | 0 | 0 | 0 | 1 | 0 | 0 | 1 | 1 | 1 | 0 | 1 | 1 | 1 | 0 | 0 | 1 | 1 | 1 | 1 | 1 | X | X | 0 | X | 0 | 0 | 0 | 0 | 0 | 0 | 0 | 0 |
| 20 | 0 | 0 | 0 | 1 | 0 | 1 | 0 | 0 | 1 | 0 | 1 | 1 | 0 | 0 | 0 | 1 | 0 | 0 | 0 | 1 | 0 | 1 | 1 | X | 0 | 0 | 0 | 0 | 0 | 0 | 1 | 0 |
| 21 | 0 | 0 | 0 | 1 | 0 | 1 | 0 | 1 | 1 | 0 | 1 | 1 | 1 | 0 | 0 | 1 | 1 | 1 | 1 | 1 | X | X | 0 | X | 0 | 0 | 0 | 0 | 0 | 0 | 0 | 0 |

*(X) DON'T CARE. CAN BE EITHER "1" OR "0"

FIG. 18 shows one possible implementation of the external read/write memory 258 of FIG. 15. The memory of FIG. 18 could take a number of forms but is compatible with the general purpose chip of FIGS. 1 through 4 of the present specification. In FIG. 18, the store 302 contains 256 words of storage having eight bits per word. The common bus 262' of FIG. 15 appears at the left in FIG. 18 and is represented by the single line 262'. The control connection bus 274' from the micro-code memory 256 appears at the lower left-hand side of FIG. 18. Additional circuits shown in FIG. 18 include the control and timing circuit 304, a common bus connection circuit 306 for gating output signals from the store 302 to the bus 262' over the data output bus 308.

The address holding register 310 retains the address provided by the arithmetic logic unit over the common bus 262' and, under the control signals on lead 312, outputs this address information. Control signals are applied to the store 302 on lead 314 from the control and timing circuit 304. The store is normally in the read state except when the write input 314 is energized.

Timing diagrams for the circuit of FIG. 18 appear in FIGS. 19 and 20. The diagram of FIG. 19 is a "read" cycle of operation, while the diagram of FIG. 20 represents a "write" cycle. The system clock shown in the upper plot of FIG. 19 is applied to the timing and control circuit 304 on lead 316. The read control signal is applied on one of the leads 274' to the control and timing circuit 304. The address from the arithmetic logic unit 252 appears on the bus 262' and is loaded into the address register 310 at the time point indicated by arrow 318 in FIG. 19. After a reasonable access time indicated by the interval 320 in FIG. 19, the data at the address location in store 302 appears on the output bus 308 and is gated through to bus 262' from which it will be loaded into the arithmetic logic unit 252 or the micro-code circuit 254 of FIG. 15.

In the write cycle shown in FIG. 20, the clock is again shown in the upper plot, and the write control signal 322 appears in the second plot. As indicated by the third line of FIG. 20, the address which appears on bus 362' is loaded into the store address register 310 during the time interval 324. During the subsequent clock interval 326, information appears on the bus 262' and it is gated into the selected register of the store 302. The arrow 328 indicates the time at which the address is loaded into the address register 310.

FIGS. 21 and 22 represent somewhat more complex examples of CPU (Central Processing Units) for performing arithmetic and other logic operations. Both the circuit of FIG. 21 and that of FIG. 22 are intended to process 16-bit binary numbers. However, a larger number of chips are employed in the circuit of FIG. 22, so that a higher speed of operation is practical.

In FIG. 21, the dashed line 332 separates the arithmetic logic unit which is above the line from the micro-code control section which appears below the dashed line. The arithmetic logic unit includes four chips, 334, 336, 338, and 340. The micro-code control section includes three of the general purpose chips, 342, 344, and 346. The common data bus 348 serves the same function as the bus 262 of FIG. 15. The micro-code control memory 350 serves the same function as the memory 256 of FIG. 15.

In FIG. 22, the arithmetic logic unit section again appears above the dashed line 352, while the micro-code control section appears below this line. In FIG. 22, the arithmetic logic unit includes four sets of general purpose chips, 354, 356, 358, and 360, each including four general purpose chips. The micro-code control section includes three chips 362. In the arrangement of FIG. 22, an address bus 364 is provided, which is separate from the two-way data bus 366. The micro-code control memory 368 serves substantially the same function as the memory 256 of FIG. 15, but, of course, on a more complex and extended scale.

With regard to the relative speed of operation of the circuits of FIGS. 21 and 22, with relatively complex operations the unit of FIG. 21 becomes quite sequential an relatively slow in its mode of operation, whereas the additional chips of the arithmetic logic unit of FIG. 22 permits higher speed and parallel operation. For example, for double precision multiplication of 16-bit numbers. the circuit of FIG. 22 accomplishes the algorithm in approximate 4.5 microseconds, while the slower circuit of FIG. 1 would take nearly three times as long, utilizing about 12.7 microseconds. The foregoing comparison is based on the operations in FIG. 22, being performed by simultaneously partial product multiplications in the various arithmetic logic units.

In the foregoing description, logic circuits of various complexity have been described, all of which can use the general purpose chip as described herein with a high degree of efficiency. Other circuits of greater or lesser degrees of complexity may, of course, also utilize its flexibility both in switching and in storage, for example, in widely divergent logic systems.

Now, in order to present a more complete picture of the chip and to make it easier for persons skilled in the art to practice the invention, several Appendices are added to complete the present specification.

APPENDIX I - INTRODUCTION

Appendix I is a list of the 64 micro-instructions implemented by the General Purpose Chip of FIGS. 1 through 4. Each mico-instruction is accomplished in one clock period. In Appendix I the "Operation Code" is the micro-instruction applied to the six terminals OPC-O through OPC-5. In Appendix I the "Operation Code" is given in "octal" form, in terms of a number system to the base 8. The first digit of the Operation Code represents the first three binary digits of the six-bit micro-instruction, and the second digit represents the remaining three binary digits. Thus, the Operation Code number 34 (octal) would represent the micro-instruction 011 100 (binary), with an octal 3 corresponding to binary 011 and an octal 4 corresponding to a binary 100. There are 64, or $2^6$ micro-instructions in Appendix I, ranging from 00 (octal) up to 77 (octal).

APPENDIX I

| OPERATION CODE | MODE CODE | OPERATION |
|---|---|---|
| 00 | 0,1,2,3 | No-Operation |
| 01 | 0 | Output T-Reg $T_0$ on CTL 1 |
| | 1 | Output T-Reg $T_1$ on CTL 1 |
| | 2 | Output T-Reg $T_2$ on CTL 1 |
| | 3 | Output T-Reg $T_3$ on CTL 1 |
| 02 | 0 | Load T-Reg $T_0$ with "0" |
| | 1 | Load T-Reg $T_1$ with "0" |
| | 2 | Load T-Reg $T_2$ with "0" |
| | 3 | Load T-Reg $T_3$ with "0" |
| 03 | 0 | Load T-Reg $T_0$ with $\bar{T}_0$ |
| | 1 | Load T-Reg $T_1$ with $\bar{T}_1$ |
| | 2 | Load T-Reg $T_2$ with $\bar{T}_2$ |
| | 3 | Load T-Reg $T_3$ with $\bar{T}_3$ |
| 04 | 0,1,2 | Load T-Reg $T_0$ with CTL 2 |
| | 3 | Load T-Reg $T_0$ with CTL 2; Output A-Reg $A_3$ or CTL 2 |
| 05 | 0 | Load A-Reg with Q-Reg |
| | 1,2,3 | Load A-Reg with B-Reg |
| 06 | 0 | Load T-Reg $T_0$ with Carry In |
| | 1 | Load T-Reg $T_1$ with Carry In |
| | 2 | Load T-Reg $T_2$ with Carry In |
| | 3 | Load T-Reg $T_3$ with Carry In |
| 07 | 0,1,2,3 | Interchange contents of A-Reg and T-Reg |
| 10 | 0 | Load A-Reg with $IN_i$; Output Exclusive or $A_0$, $T_0$ on CTL 1 |
| | 1 | Load A-Reg with $IN_i$; Output Exclusive or $A_1$, $T_1$ on CTL 1 |
| | 2 | Load A-Reg with $IN_i$; Output Exclusive or |

APPENDIX I-continued

| OPERATION CODE | MODE CODE | OPERATION |
|---|---|---|
| | | $A_2$, $T_2$ on CTL 1 |
| | 3 | Load A-Reg with $IN_1$; Output Exclusive or $A_3$, $T_3$ on CTL 1 |
| 11 | 0 | Load A-Reg with $IN_2$; Output Exclusive or $A_0$, $T_0$ on CTL 1 |
| | 1 | Load A-Reg with $IN_2$; Output Exclusive or $A_1$, $T_1$ on CTL 1 |
| | 2 | Load A-Reg with $IN_2$; Output Exclusive or $A_2$, $T_2$ on CTL 1 |
| | 3 | Load A-Reg with $IN_2$; Output Exclusive or $A_3$, $T_3$ on CTL 1 |
| 12 | 0 | Load B-Reg with stack; Decrement stack pointer by one |
| | 1,2,3 | Load A-Reg with stack; Decrement stack pointer by one |
| 13 | 0 | Load A-Reg with stack |
| | 1,2,3 | Load A-Reg with file |
| 14 | 0 | Increment A-Reg by one, and store result in stack location, stack pointer plus one. Load A-Reg with $IN_2$ |
| | 1,2,3 | Increment A-Reg by one and store result in stack location, stack pointer plus one. Load A-Reg with $IN_1$ |
| 15 | 0 | Store B-Reg in stack location, stack pointer plus 1; Increment stack pointer by one |
| | 1,2,3 | Store A-Reg in stack location, stack pointer plus 1; Increment stack pointer by one. |
| 16 | 0 | No-operation |
| | 1,2,3 | Load A-Reg with "0" |
| 17 | 0 | Decrement A-Reg by one; Load T-Reg $T_2$ with overflow |
| | 1,2,3 | Increment A-Reg by one; Load T-Reg $T_2$ with overflow |
| 20 | 0 | Load B-Reg with $IN_2$ |
| | 1,2,3 | Load B-Reg with $IN_1$ |
| 21 | 0 | Load B-Reg with Q-Reg |
| | 1,2,3 | Load B-Reg with A-Reg |
| 22 | 0 | Load B-Reg with "0" |
| | 1,2,3 | Interchange contents of A-Reg and B-Reg |
| 23 | 0 | Load B-Reg with stack |
| | 1,2,3 | Load B-Reg with file |
| 24 | 0,1,2,3 | If $T_0 = 1$ subtract B-Reg from A-Reg; Load T-Reg $T_2$ with overflow |
| | 0,1,2,3 | If $T_0 = 0$ add B-Reg to A-Reg; Load T-Reg $T_2$ with overflow |
| 25 | 0 | If $T_0 = 1$ load A-Reg with $\bar{A}$ |
| | 0 | If $T_0 = 0$ load A-Reg with A |
| | 1,2,3 | Load A-Reg with $\bar{A}$ |
| 26 | 0,1,2,3 | Single step of a divide (nonrestoring method) |
| 27 | 0,1,2,3 | Single step of a multiply (Booth method) |
| 30 | 0 | Load Q-Reg with $IN_2$ |
| | 1,2,3 | Load Q-Reg with $IN_1$ |
| 31 | 0 | Load Q-Reg with B-Reg |
| | 1,2,3 | Load Q-Reg with A-Reg |
| 32 | 0,1,2,3 | Interchange contents of A-Reg and Q-Reg |
| 33 | 0 | Add A-Reg and B-Reg with T-Reg $T_3$ as Carry In, result in A-Reg |
| | 1,2,3 | Add A-Reg and B-Reg, result in A-Reg |
| 34 | 0 | Store B-Reg in stack |
| | 1,2,3 | Store B-Reg in file |
| 35 | 0 | Store A-Reg in stack |
| | 1,2,3 | Store A-Reg in file |
| 36 | 0,1,2,3 | Compare A-Reg with B-Reg; load T-Reg $T_2$ with compare |
| 37 | 0 | Subtract B-Reg from A-Reg with T-Reg $T_3$ as Carry In, result in A-Reg |
| | 1,2,3 | Subtract B-Reg from A-Reg, result in A-Reg |
| 40 | 0 | Output A-Reg $A_3$ on CTL 1 |
| | 1,2 | Shift right A-Reg, input ASU in $A_3$ |
| | 3 | Arithmetic shift right A-Reg, input $A_3$ in $A_3$ |
| 41 | 0 | Logical OR A-Reg and B-Reg, result in A-Reg; Output logical or $A_3$, $B_3$ on CTL 1 |
| | 1,2,3 | Logical AND A-Reg and B-Reg, result in A-Reg; Output logical AND $A_3$, $B_3$ on CTL 1 |
| 42 | 0 | Increment stack pointer by one |
| | 1,2 | Shift right A-Reg, input ASU in $A_3$ |
| | 3 | Shift right A-Reg, input T-Reg $T_3$ in $A_3$; Load T-Reg $T_3$ with OSU. |
| 43 | 0 | Exclusive NOR A-Reg with B-Reg, result in A-Reg; Output Exclusive NOR $A_3$, $B_3$ on CTL 1. |
| | 1,2,3 | Exclusive OR A-Reg with B-Reg, result in A-Reg; Output Exclusive OR $A_3$, $B_3$ on CTL 1. |
| 44 | 0,1,2,3 | No-operation |
| 45 | 0,1,2,3 | No-operation |
| 46 | 0 | Decrement stack pointer by one |
| | 1,2 | Shift left A-Reg, input ASL in $A_0$ |
| | 3 | Shift left A-Reg, input ASL in $A_0$; Input T-Reg $T_3$ with $A_3$; Output T-Reg $T_3$ on QSU. |
| 47 | 0,1,2,3 | No-operation |
| 50 | 0,1,2 | Logical shift right of A-Reg and Q-Reg; Input ASU in $A_3$; Input QSU in $Q_3$; Output $A_0$ |

APPENDIX I-continued

| OPERATION CODE | MODE CODE | OPERATION |
|---|---|---|
| | | ASL; Output $Q_0$ on QSL; Output Exclusive OR $A_2$, $A_1$ (NORMALIZE) on CTL 1. |
| | 3 | Arithmetic shift right of A-Reg; Logical shift right of Q-Reg; Input QSU in $Q_3$; Output $A_0$ on ASL; Output $Q_0$ on QSL; Output Exclusive OR $A_2$, $A_1$ on CTL 1. |
| 51 | 0 | Output stack pointer full on CTL 1 |
| | 1,2 | Logical shift right of Q-Reg; Input QSU in $Q_3$; Output $Q_0$ on QSL. |
| | 3 | Shift right Q-Reg; Input "0" in $Q_3$; Output $Q_0$ on QSL. |
| 52 | 0 | Load stack pointer with block (FILE) pointer. |
| | 1,2 | Logical shift right of A-Reg and Q-Reg; Input ASU in $A_3$; Input QSU in $Q_3$; Output $A_0$ on ASL; Output $Q_0$ on QSL. |
| | 3 | Shift right of A-Reg and Q-Reg; Input Exclusive or $A_3$, $T_2$ (overflow) in $A_3$; Input QSU in $Q_3$, Output $A_0$ on ASL; Outut $Q_0$ on QSL. |
| 53 | 0 | Output T-Reg $T_2$ on CTL 1. |
| | 1,2 | Shift right Q-Reg; Input QSU in $Q_3$; Output $Q_0$ on QSL. |
| | 3 | Shift right Q-Reg; Input ASU in $Q_3$, Output $Q_0$ on QSL. |
| 54 | 0,2,3 | Shift Left A-Reg and Q-Reg; Input ASL in $A_0$; Input QSL in $Q_0$; Output $A_3$ on ASU; Output $Q_3$ on QSU; Output Exclusive OR $A_2$, $A_1$ on CTL 1. |
| | 1 | Shift left A-Reg and Q-Reg; Input ASL in $A_0$; Input "0" in $Q_0$; Output $A_3$ on ASU; Output $Q_3$ on QSU; Output Exclusive OR $A_2$, $A_1$ on CTL 1. |
| 55 | 0,1,2,3 | No-operation |
| 56 | 0 | Output Exclusive OR $A_3$, $A_2$ (NORMALIZE) on CTL 1 |
| | 1 | Shift left Q-Reg; Input "0" in $Q_0$; Output $Q_3$ on QSU. |
| | 2,3 | Shift left Q-Reg; Input QSL in $Q_0$; Output $Q_3$ on QSU. |
| 57 | 0 | Output T-Reg $T_1$ on CTL 1 |
| | 1 | Shift left Q-Reg; Input ASL in $Q_0$; Output $Q_3$ on QSU. |
| | 2,3 | Shift left Q-Reg; Input QSL in $Q_0$; Output $Q_3$ on QSU. |
| 60 | 0 | Load block (file) pointer with $(00)_8$ |
| | 1,2,3 | No-operation |
| 61 | 0 | Load block pointer with $(01)_8$ |
| | 1,2,3 | No-operation |
| 62 | 0 | Load block pointer with $(02)_8$ |
| | 1,2,3 | No-operation |
| 63 | 0 | Load block ponter with $(03)_8$ |
| | 1,2,3 | No-operation |
| 64 | 0 | Load block pointer with $(04)_8$ |
| | 1,2,3 | No-operation |
| 65 | 0 | Load block pointer with $(05)_8$ |
| | 1,2,3 | No-operation |
| 66 | 0 | Load block pointer with $(06)_8$ |
| | 1,2,3 | No-operation |
| 67 | 0 | Load block pointer with $(07)_8$ |
| | 1,2,3 | No-operation |
| 70 | 0 | Load block pointer with $(10)_8$ |
| | 1,2,3 | No-operation |
| 71 | 0 | Load block pointer with $(11)_8$ |
| | 1,2,3 | No-operation |
| 72 | 0 | Load block pointer with $(12)_8$ |
| | 1,2,3 | No-operation |
| 73 | 0 | Load block pointer with $(13)_8$ |
| | 1,2,3 | No-operation |
| 74 | 0 | Load block poiner with $(14)_8$ |
| | 1,2,3 | No-operation |
| 75 | 0 | Load block pointer with $(15)_8$ |
| | 1,2,3 | No-operation |
| 76 | 0 | Load block pointer with $(16)_8$ |
| | 1,2,3 | No-operation |
| 77 | 0 | Load block pointer with $(17)_8$ |
| | 1,2,3 | No-operation |

APPENDIX II - INTRODUCTION

Appendix II lists the forty-two access terminals of the General Purpose Chip and gives a brief description of their function.

APPENDIX II

| EXTERNAL CONNECTION | FUNCTION |
|---|---|
| +5 | |
| +12 | |
| GROUND | |
| RESET | Low-going signal resets the micro up-code (OPC) register stack pointer and A-register. Also the four data output lines are enabled to a low level |

APPENDIX II-continued

| EXTERNAL CONNECTION | FUNCTION |
|---|---|
| | (ground) signal. Reset signal is synchronized to clock. |
| CLOCK | Basic operating frequency for synchronized operation. Registers and flip-flops are triggered on negative-going clock edge. |
| CLOCK CONTROL | Enables or disables clock: 1 = Enable, 0 = Disable |
| PLA CLOCK | Free running clock to precharge PLA circuits. Must be synchronous to clock. A duty cycle is required. |
| OPCO, OPC1, OPC2, OPC3, OPC4, OPC5 | Basic microcode field used with mode control field to provide microcommands for GPA operation. |
| M1, M2 | Mode control field to determine GPA byte position of a data word. Also used in conjunction with microcode field to determine GPA operation.<br>M2 M1<br>0 0 S4 Extended operation state<br>0 1 S3 Least significant byte of 4 bits<br>1 0 S2 Next successive byte of 4 bits or Least significant byte<br>1 1 S1 Most significant byte of 4 bits. |
| OCC1 OCC2 | Provide the sélection of GPA microcommand source<br>OCC1 OCC2<br>0 0 Load microcommand field in OPC register No-Operation<br>0 1 Enable microcommand from input lines<br>1 0 Enable microcommand from OPC register<br>1 1 Load microcommand in OPC register, enable microcommand from OPC register |
| $IN1_0$, $IN1_1$, $IN1_2$, $IN1_3$ | Group 1 - 4-bit parallel data input: 1 = true, 0 = false |
| $IN2_0$, $IN2_1$, $IN2_2$, $IN2_3$ | Group 2 - 4-bit parallel data input: 1 = true, 0 = false |
| $OUT_0$, $OUT_1$, $OUT_2$, $OUT_3$ | 4-bit parallel data output |
| OUT ENABLE | Enables data output: 1 = enable, 0 = disable |
| OS1, OS2 | Selects data output<br>OS1 OS2<br>0 0 $IN_1$ data group<br>0 1 A-Register<br>1 0 $IN_2$ data group<br>1 1 Q-Register |
| QSU | High order bit Input/Output for shift Q-Register: 1 = true, 0 = false High impedence = off |
| QSL | Low order bit Input/Output for shift Q-Register: 1 = true, 0 = false High impedence = off |
| ASU | High order bit Input/Output for shift A-Register: 1 = true, 0 = false High impedence = off |
| ASL | Low order bit Input/Output for shift A-Register: 1 = true, 0 = false High impedence = off |
| $C_{IN}$ | Carry Input: 1 = carry, 0 = no carry |
| $C_{OUT}$ | Carry Output: 1 = carry, 0 = no carry |
| $C_G$ | Carry Generate 1 = carry generate, 0 = no carry generate |
| $CTL_1$ | Control Line 1 Output: 1 = true, 0 = false, high impedence = off |
| ENABLE | Control Line 1 Enable: 1 = enable, 0 = disable |
| $CTL_2$ | Control Line 2 Input/Output: 1 = true, 0 = false, high impedence = off |

NOTE: "1" and "0" notation is in positive logic convention. 1 = +V, 0 = Ground

APPENDIX III - INTRODUCTION

Appendix III gives shorthand notation symbols which are employed to describe the computer and logic operations listed in Appendix IV for the general purpose chip, in addition to the micro-code format.

APPENDIX III

| Symbols | Description |
|---|---|
| ( ) | Contents of |
| ⟹ | Transfer contents of one register to another |
| M<X> | Location of a File/stack register addressed by X |
| (M<X>) | Contents of a File/stack register addressed by X |

APPENDIX III-continued

| Symbols | Description |
|---|---|
| → | Move to |
| $\xrightarrow{s}$ | Shift one place to right |
| $\xleftarrow{s}$ | Shift one place to left |
| Λ | And |
| V | Or |
| ⊻ | Exclusive Or |
| + | Add |
| − | Subtract |
| 0 | High Impedance State |
| Σ | Arithmetic Logic Unit (ALU) function output |
| A-REG or A | A-Register |

APPENDIX III-continued

| Symbols | Description |
|---|---|
| B-REG or B | B-Register |
| Q-REG or Q | Q-Register |
| T-REG or T | T-Register |
| SP | Stack Pointer Address Counter |
| FP | File Pointer Address Register |
| $C_{in}$ | Carry In |
| $C_{out}$ | Carry Out |
| $C_G$ | Carry Generate |
| $C_{n+4}$ | Ripple Carry |
| OPC | Operational-code Register |
| OC | Operational-code |
| CTL 1 | Control Line 1 |
| CTL 2 | Control Line 2 |
| M | Stack or File RAM |
| $A_n$, $B_n$, $Q_n$, $T_n\Sigma_n$ | n = bit position (where n = 0,1,2,3) |

APPENDIX III-continued

| Symbols | Description |
|---|---|
| Micro-code Format | M2 M1 OPC5 OPC4 OPC3 OPC2 OPC1 OPC0 [ ] |

APPENDIX IV - INTRODUCTION

Appendix IV lists a number of computer and logic operations together with the eight-bit micro-code by which the operations are implemented, and briefly describes each operation. A mnemonic for the operation is listed at the left of each operation.

APPENDIX IV

T0C1 — [0 0 0 0 0 0 0 1]
Operation: $T_0 \rightarrow$ CTL 1
Description: Selects least significant bit of T-REG for CLT 1 output.

T1C1 — [0 1 0 0 0 0 0 1]
Operation: $T_1 \rightarrow$ CTL 1
Description: Selects next least significant bit of T-REG for CLT 1 output.

T2C1 — [1 0 0 0 0 0 0 1]
Operation: $T_2 \rightarrow$ CTL 1
Description: Selects next most significant bit of T-REG for CLT 1 output.

T3C1 — [1 1 0 0 0 0 0 1]
Operation: $T_3 \rightarrow$ CTL 1
Description: Selects most significant bit of T-REG for CLT 1 output.

LT0Z — [0 0 0 0 0 0 1 0]
Operation: $O \rightarrow T_0$, $T_0 \rightarrow$ CTL 1
Description: Loads zero in least significant bit of T-REG and selects same T-REG bit for CTL 1 output.

LT1Z — [0 1 0 0 0 0 1 0]
Operation: $O \rightarrow T_1$, $T_1 \rightarrow$ CTL 1
Description: Loads zero in next to least significant bit of T-REG and selects same T-REG bit for CTL 1 output.

LT2Z — [1 0 0 0 0 0 1 0]
Operation: $O \rightarrow T_2$, $T_2 \rightarrow$ CTL 1
Description: Loads zero in next to most significant bit of T-REG and selects same T-REG bit for CTL 1 output.

LT3Z — [1 1 0 0 0 0 1 0]
Operation: $O \rightarrow T_3$, $T_3 \rightarrow$ CTL 1
Description: Loads zero in most significant bit of T-REG and selects same T-REG bit for CTL 1 output.

LT0C — [0 0 0 0 0 0 1 1]
Operation: $\overline{T_0} \rightarrow T_0$, $T_0 \rightarrow$ CTL 1
Description: Loads complement of least significant bit of T-REG back to itself and selects the true state for CTL 1 output.

LT1C — [0 1 0 0 0 0 1 1]
Operation: $\overline{T_1} \rightarrow T_1$, $T_1 \rightarrow$ CTL 1
Description: Loads complement of next to least significant bit of T-REG back to itself and selects the true state for CTL 1 output.

LT2C — [1 0 0 0 0 0 1 1]
Operation: $\overline{T_2} \rightarrow T_2$, $T_2 \rightarrow$ CTL 1
Description: Loads complement of next to most significant bit of T-REG back to itself and selects the true state for CTL 1 output.

LT3C — [1 1 0 0 0 0 1 1]
Operation: $\overline{T_3} \rightarrow T_3$, $T_3 \rightarrow$ CTL 1
Description: Loads complement of most significant bit of T-REG back to itself and selects the true state for CTL 1 output.

LTC2 — [0 0 0 0 0 1 0 0] [0 1 0 0 0 1 0 0] [1 0 0 0 0 1 0 0]
Operation: CTL 2 $\rightarrow T_0$
Description: Loads least significant bit of T-REG with CTL 2.

OAC2 — [1 1 0 0 0 1 0 0]
Operation: $A_3 \rightarrow$ CTL 2, CTL 2 $\rightarrow T_0$
Description: Outputs most significant bit of A-REG on CTL 2 and loads least significant bit of T-REG with CTL 2.

APPENDIX IV-continued

LAO `0 0 0 0 0 1 0 1`

Operation: $(O) \Rightarrow A$

Description: Loads A-REG with contents of O-REG.

LAB `0 1 0 0 0 1 0 1`

`1 0 0 0 0 1 0 1`

`1 1 0 0 0 1 0 1`

Operation: $(B) \Rightarrow A$

Description: Loads A-REG with contents of B-REG.

LT0C1 `0 0 0 0 0 1 1 0`

Operation: $C_{in} \rightarrow T_0,\ T_0 \rightarrow CTL\ 1$

Description: Loads least significant bit of T-REG with Carry In and selects same T-REG bit for CTL 1 output.

LT1C1 `0 1 0 0 0 1 1 0`

Operation: $C_{in} \rightarrow T_1,\ T_1 \rightarrow CTL\ 1$

Description: Loads next to least significant bit of T-REG with Carry In and selects same T-REG bit for CTL 1 output.

LT2C1 `1 0 0 0 0 1 1 0`

Operation: $C_{in} \rightarrow T_2,\ T_2 \rightarrow CTL\ 1$

Description: Loads next to most significant bit of T-REG with Carry In and selects same T-REG bit for CTL 1 output.

LT3C1 `1 1 0 0 0 1 1 0`

Operation: $C_{in} \rightarrow T_3,\ T_3 \rightarrow CTL\ 1$

Description: Loads most significant bit of T-REG with Carry In and selects same T-REG bit for CTL 1 output.

AXT `X X 0 0 0 1 1 1`

Operation: $(A) \Rightarrow T$ $(T) \Rightarrow A$

Description: Moves contents of A-REG to T-REG and T-REG contents to A-REG.

LA1E0 `0 0 0 0 1 0 0 0`

Operation: $IN_1 \Rightarrow A,\ A_0 \forall T_0 \rightarrow CTL\ 1$

Description: Loads A-REG with Input Data Group I and selects ALU output, $\Sigma_0$, to output the exclusive or function of $A_0$ and $T_0$ on CTL 1.

LA1E1 `0 1 0 0 1 0 0 0`

Operation: $IN_1 \Rightarrow A,\ A_1 \forall T_1 \rightarrow CTL\ 1$

Description: Loads A-REG with Input Data Group I and selects ALU output, $\Sigma_1$, to output the exclusive or function of $A_1$ and $T_1$ on CTL 1.

LA1E2 `1 0 0 0 1 0 0 0`

Operation: $IN_1 \Rightarrow A,\ A_2 \forall T_2 \rightarrow CTL\ 1$

Description: Loads A-REG with Input Data Group I and selects ALU output, $\Sigma_2$, to output the exclusive or function of $A_2$ and $T_2$ on CTL 1.

LA1E3 `1 1 0 0 1 0 0 0`

Operation: $IN_1 \Rightarrow A,\ A_3 \forall T_3 \rightarrow CTL\ 1$

Description: Loads A-REG with Input Data Group I and selects ALU output, $\Sigma_3$, to output the exclusive or function of $A_3$ and $T_3$ on CTL 1.

LA2E0 `0 0 0 0 1 0 0 1`

Operation: $IN_2 \Rightarrow A,\ A_0 \forall T_0 \rightarrow CTL\ 1$

Description: Loads A-REG with Input Data Group II and selects ALU output, $\Sigma_0$, to output the exclusive or function of $A_0$ and $T_0$ on CTL 1.

LA2E1 `0 1 0 0 1 0 0 1`

Operation: $IN_2 \Rightarrow A,\ A_1 \forall T_1 \rightarrow CTL\ 1$

Description: Loads A-REG with Input Data Group II and selects ALU output, $\Sigma_1$, to output the exclusive or function of $A_1$ and $T_1$ on CTL 1.

LA2E2 `1 0 0 0 1 0 0 1`

Operation: $IN_2 \Rightarrow A,\ A_2 \forall T_2 \rightarrow CTL\ 1$

Description: loads A-REG with Input Data Group II and selects ALU output,$\Sigma^2$, to output the exclusive or function of $A_{2\ and\ T2}$ on CTL 1.

LA2E3 `1 1 0 0 1 0 0 1`

Operation: $IN_2 \Rightarrow A,\ A_3 \forall T_3 \rightarrow CTL\ 1$

Description: Loads A-REG with Input Data Group II and selects ALU output, $\Sigma_3$, to output the exclusive or function of $A_3$ and $T_3$ on CTL 1.

LBSD `0 0 0 0 1 0 1 0`

Operation: (M<SP>) $\rightarrow B,\ SP-1 \rightarrow SP$

Description: Loads B-REG with stack contents at location addressed by Stack Pointer. Decrements Stack Pointer by one at end of cycle. Stack contents remain unchanged.

LASD `0 1 0 0 1 0 1 0`

`1 0 0 0 1 0 1 0`

`1 1 0 0 1 0 1 0`

APPENDIX IV-continued

Operation: (M<SP>) → A, SP−1 → SP

Description: Loads A-REG with stack contents at location addressed by Stack Pointer. Decrements Stack Pointer by one at end of cycle. Stack contents remain unchanged.

LAS [0 0 0 0 1 0 1 1]

Operation: (M<SP>) → A

Description: Loads A-REG with stack contents at location addressed by Stack Pointer. Stack contents remain unchanged.

LAF [0 1 0 0 1 0 1 1]

[1 0 0 0 1 0 1 1]

[1 1 0 0 1 0 1 1]

Operation: (M<FP>) → A

Description: Loads A-REG with File contents at location addressed by File Pointer. File contents remain unchanged.

SIA2 [0 0 0 0 1 1 0 0]

Operation:
A+1 → M<SP+1>
1 → $C_G$
$C_{n+4}$ → $C_{out}$
$IN_2$ → A
SP+1 → SP

Description: Contents of A-REG is incremented by one and moved to Stack in location addressed by Stack Pointer plus one. A Logic "1" is selected on Carry Generate and Ripple Carry is selected on Carry Out to enable A+1 arithmetic. At end of clock period, A-REG is loaded with new data from Input Group II and Stack Pointer is incremented by one.

SIA1 [0 1 0 0 1 1 0 0]

[1 0 0 0 1 1 0 0]

[1 1 0 0 1 1 0 0]

Operation:
A+1 → M<SP+1>
1 → $C_G$
$C_{n+4}$ → $C_{out}$
$IN_1$ → A
SP+1 → SP

Description: Contents of A-REG is incremented by one and moved to Stack in location addressed by Stack Pointer plus one. A Logic "1" is selected on Carry Generate and Ripple Carry is selected on Carry Out to enable A+1 arithmetic. At end of clock period, A-REG is loaded with new data from Input Group I and Stack Pointer is incremented by one.

SBIS [0 0 0 0 1 1 0 1]

Operation:
(B) → M<SP+1>
SP+1 → SP

Description: Moves contents of B-REG to Stack addressed by Stack Pointer plus one. B-REG remain unchanged. Increments Stack Pointer by one.

SAIS [0 1 0 0 1 1 0 1]

[1 0 0 0 1 1 0 1]

[1 1 0 0 1 1 0 1]

Operation:
(A) → M<SP+1>
SP+ 1 → SP

Description: Moves contents of A-REG to Stack addressed by Stack Pointer plus one. A-REG remain unchanged. Increments Stack Pointer by one.

LAZ [X X 0 0 1 1 1 0]

Operation: 0 → A

Description: Loads A-REG with all zeros.

DALT [0 0 0 0 1 1 1 1]

Operation:
A−1 → A
0 → $C_G$
$C_{n+4}$ → $C_{out}$
$C_{n+4}$ → $T_3$
Overflow → $T_2$ Description: Decrements contents of A-REG by one. Selects Logic zero on Carry Generate and Ripple Carry on Carry Out to enable A−1 arithmetic. Bit positions enables $T_2$ and $T_3$ of T-REG to store overflow and ripple carry conditions, respectively.

IALT [0 1 0 0 1 1 1 1]

[1 0 0 0 1 1 1 1]

[1 1 0 0 1 1 1 1]

Operation:
A+1 → A
1 → $C_G$
$C_{n+4}$ → $C_{out}$
$C_{n+4}$ → $T_3$
Overflow → $T_2$

APPENDIX IV-continued

Description: Increments contents of A-REG by one. Selects Logic "1" on Carry Generate and Ripple Carry on Carry Out to enable A+1 arithmetic. Enables $T_2$ and $T_3$ of T-REG to store overflow and ripple carry conditions, respectively.

LB2

0 0 0 1 0 0 0 0

Operation: $IN_2 \Rightarrow B$
Description: Loads B-REG with new data from Input Group II.

LB1

0 1 0 1 0 0 0 0

1 0 0 1 0 0 0 0

1 1 0 1 0 0 0 0

Operation: $IN_1 \Rightarrow B$
Description: Loads B-REG with new data from Input Group I.

LBQ

0 0 0 1 0 0 0 1

Operation: $(Q) \Rightarrow B$
Description: Loads B-REG with contents of Q-REG. Q-REG remain unchanged.

LBA

0 1 0 1 0 0 0 1

1 0 0 1 0 0 0 1

1 1 0 1 0 0 0 1

Operation: $(A) \Rightarrow B$
Description: Loads B-REG with contents of A-REG. A-REG remain unchanged.

LBZ

0 0 0 1 0 0 1 0

Operation: $0 \Rightarrow B$
Descripton: Loads B-REG with all zeros.

AXB

0 1 0 1 0 0 1 0

1 0 0 1 0 0 1 0

1 1 0 1 0 0 1 0

Operation: $(A) \Longleftrightarrow (B)$
Description: Moves contents of A-REG to B-REG and contents of B-REG to A-REG.

LBS

0 0 0 1 0 0 1 1

Operation: $(M<SP>) \Rightarrow B$
Description: Loads B-REG with Stack contents at location addressed by Stack Pointer. Stack contents remain unchanged.

LBF

0 1 0 1 0 0 1 1

1 0 0 1 0 0 1 1

1 1 0 1 0 0 1 1

Operation: $(M<FP>) \Rightarrow B$
Description: Loads B-REG with File contents at location addressed by File Pointer. File contents remain unchanged.

ABT

X X 0 1 0 1 0 0

Operation:
If $T_0 = 1$,
$A - B \rightarrow A$
$1 \rightarrow C_L$
$C_{n+1} \rightarrow C_{out}$
$C_{n+1} \rightarrow T_3$
Overflow $\rightarrow T_2$
If $T_0 = 0$,
$A + B \rightarrow A$
$0 \rightarrow C_L$
$C_{n+1} \rightarrow C_{out}$
$C_{n+1} \rightarrow T_3$
Overflow $\rightarrow T_2$

Description: Operation is conditioned to Logic state of $T_0$ bit position of T-REG. If $T_0$ is a logic one then contents of B-REG is subtracted from A-REG with result placed in A-REG. B-REG remain unchanged. If $T_0$ is a logic zero then contents of B-REG is added to A-REG with result placed in A-REG. B-REG remain unchanged. In either $T_0$ condition carry generate and ripple carry are enabled accordingly. $T_2$ and $T_3$ of T-REG are enabled to store overflow and ripple carry conditions, respectively.

CPLT

0 0 0 1 0 1 0 1

Operation:
If $T_0 = 1$, $(\bar{A}) \Rightarrow A$
If $T_0 = 0$, $(A) \Rightarrow A$

Description: Operation is conditioned to logic state of $T_0$ bit position of T-REG. If $T_0$ is a logic one, A-REG is loaded with its complement. If $T_0$ is a logic zero, A-REG remain unchanged.

CPL

0 1 0 1 0 1 0 1

1 0 0 1 0 1 0 1

1 1 0 1 0 1 0 1

APPENDIX IV-continued

Operation: $(\overline{A}) \Rightarrow A$
Description: Loads A-REG with its complement.

DIVN `0 1 0 1 1 0`

Operation:
If CTL 2 = 1
$AL - B \rightarrow A$
where AL = Contents of A-REG shifted one place to left
$A_3 \rightarrow ASU$
$ASL \rightarrow A$
$Q \xleftarrow{s} Q$
$Q_3 \rightarrow QSU$
$QSL \rightarrow Q_0$*
$1 \rightarrow C_n$
$C_{n+4} \rightarrow T_3$
Overflow $\rightarrow T_2$
If GPA = MSB $(M1\ M2)\ \overline{A_3 \forall B_3} \rightarrow$ CTL 2
If GPA $\neq$ MSB $(\overline{M1\ M2})$ High Impedance $\rightarrow$ CTL 2
*If GPA = LSB $(M1\ \overline{M2})$ CTL 2 $\rightarrow Q_0$
If CTL 2 = 0
$AL + B \rightarrow A$
$A_3 \rightarrow ASU$
$ASL \rightarrow A_0$
$Q \xleftarrow{s} Q$
$Q_3 \rightarrow QSU$
$QSL \rightarrow Q_0$*
$C_{n+4} \rightarrow T_3$
Overflow $\rightarrow T_2$
If GPA = MSB $(M1 \cdot M2)\ \overline{A_3 \forall B_3} \rightarrow$ CTL 2
If GPA $\neq$ MSB $(\overline{M1\ M2})$ High Impedance $\rightarrow$ CTL 2
*If GPA = LSB $(M1\ \overline{M2})$ CTL 2 $\rightarrow Q_0$ Description: Performs a single step of the nonrestoring method of binary division. The divisor (contents of B-REG) is either added or subtracted from the partial remainder (contents of A-REG) depending on the signs of the divisor and that of the partial remainder. If both signs agree a subtraction is performed and a logic one quotient is left shifted into least significant bit position of Q-REG. If signs do not agree, an addition is performed and a logic zero quotient is entered in Q-REG. In either case a new partial remainder is formed by a proper shift and the process continues until remainder is either zero or the desired number of quotient bit is obtained. The least significant GPA internally selects CTL2 as input to the least significant bit of Q-REG. Other GPA positions has QSL as the input.

MPYB `0 1 0 1 1 1`

Operation:
Case I: If CTL 2 = 0, $T_0 = 1$
Then: $(A+B) \xrightarrow{s} A$
If GPA = MSB, $(M1 \cdot M2)\ \Sigma_3 \forall OVFL \rightarrow A_3$;
If GPA $\neq$ MSB, $ASU \rightarrow A_3$
$(A_0 + B_0) \rightarrow ASL$
$Q \xrightarrow{s} Q$
$QSU \rightarrow Q_3$
$Q_0 \rightarrow QSL$
$0 \rightarrow C_n$
CTL 2 $\rightarrow T_0$
Overflow $\rightarrow T_2$
If GPA = LSB $(M1 \cdot \overline{M}2)$ then $Q_0 \rightarrow$ CTL 2
If GPA $\neq$ LSB High Impedance $\rightarrow$ CTL 2
Case II: If CTL 2 = 1, $T_0 = 0$
Then: $(A-B) \xrightarrow{s} A$
If GPA = MSB, $\Sigma_3 \forall OVFL \rightarrow A_3$
If GPA $\neq$ MSB, $ASU \rightarrow A_3$
$A_0 - B_0 \rightarrow ASL$
$Q \xrightarrow{s} Q$
$QSU \rightarrow Q_3$
$Q_0 \rightarrow QSL$
$1 \rightarrow C_n$
CTL 2 $\rightarrow T_0$
Overflow $\rightarrow T_2$
If GPA = LSB, $Q_0 \rightarrow$ CTL 2
If GPA $\neq$ LSB, High Impedance $\rightarrow$ CTL 2
Case III: CTL 2 = $T_0$ = 1 or CTL 2 = $T_0$ = 0
Then: $A \xrightarrow{s} A$
If GPA = MSB, $\Sigma_3 \rightarrow A_3$
If GPA $\neq$ MSB, $ASU \rightarrow A_3$
$A_0 \rightarrow ASL$
$Q \xrightarrow{s} Q$
$QSU \rightarrow Q_3$
$Q_0 \rightarrow QSL$
CTL 2 $\rightarrow T_0$
Overflow $\rightarrow T_2$
If GPA = LSB, $Q_0 \rightarrow$ CTL 2
If GPA $\neq$ LSB, High Impedance $\rightarrow$ CTL 2

APPENDIX IV-continued

Description: Performs a single step of Booth's method for binary multiplication. The logic condition of the two least significant bits of the multiplier (contents of Q-REG with CTL 2 and $T_0$ as least significant bits extension) determine operation. If CTL 2 = 0, $T_0$ = 1 then the multiplicand (contents of B-REG) is added to the partial product (A-REG). Resultant partial product and multiplier shifted one place to the right. If CTL 2 = 1, $T_0$ = 0, then the multiplicand is subtracted from partial product. Resultant partial product and multiplier shifted one place to the right. If CTL 2 and $T_0$ agree, then partial product and multiplier are shifted one place to the right without arithmetic operation with the multiplicand. In each of the cases (I, II or III) the least significant bit of the multiplier is selected on CTL 2 output and the most significant bit position of the partial product has the most significant ALU output as an input.

LQ2 | 0 0 0 1 1 0 0 0 |

Operation: $IN_2 \Rightarrow Q$

Description: Loads Q-REG with new data from Input Group II.

LQ1 | 0 1 0 1 1 0 0 0 |

| 1 0 0 1 1 0 0 0 |

| 1 1 0 1 1 0 0 0 |

Operation: $IN_2 \Rightarrow Q$

Description: Loads Q-REG with new data from Input Group I.

LQB | 0 0 0 1 1 0 0 1 |

Operation: $(B) \Rightarrow Q$

Description: Loads Q-REG with contents of B-REG. B-REG remain unchanged.

LQA | 0 1 0 1 1 0 0 1 |

| 1 0 0 1 1 0 0 1 |

| 1 1 0 1 1 0 0 1 |

Operation: $(A) \Rightarrow Q$

Description: Loads Q-REG with contents of A-REG. A-REG remain unchanged.

AXQ | X X 0 1 1 0 1 0 |

Operation: $(A) \Leftrightarrow (Q)$

Description: Moves contents of A-REG to B-REG and contents of B-REG to A-REG.

ADDT | 0 0 0 1 1 0 1 1 |

Operation:
$A + B + T_3 \rightarrow A$
$T_3 \rightarrow C_G$
$C_{n+4} \rightarrow C_{out}$
$C_{n+4} \rightarrow T_3$
$\text{Overflow} \rightarrow T_2$ Description: Adds contents of A-REG and B-REG with $T_3$ of T-REG as carry input. Sum placed in A-REG. B-REG remain unchanged. Selects $T_3$ on Carry Generate and Ripple Carry on Carry Out to enable proper arithmetic. Enables $T_2$ and $T_3$ to store overflow and ripple carry conditions, respectively.

ADD | 0 1 0 1 1 0 1 1 |

| 1 0 0 1 1 0 1 1 |

| 1 1 0 1 1 0 1 1 |

Operation:
$A + B \rightarrow A$
$O \rightarrow C_G$
$C_{n+4} \rightarrow C_{out}$
$C_{n+4} \rightarrow T_3$
$\text{Overflow} \rightarrow T_2$ Description: Adds contents of A-REG and B-REG and places sum in A-REG. B-REG remain unchanged. Selects logic zero on Carry Generate and Ripple Carry on Carry Out to enable proper arithmetic. Enables $T_2$ and $T_3$ of T-REG to store overflow and ripple carry conditions, respectively.

SBS | 0 0 0 1 1 1 0 0 |

Operation: (B) $\Rightarrow$ M<SP>

Description: Moves contents of B-REG to Stack addressed by Stack Pointer. B-REG and Stack Pointer remain unchanged.

SBF | 0 1 0 1 1 1 0 0 |

| 1 0 0 1 1 1 0 0 |

| 1 1 0 1 1 1 0 0 |

Operation: (B) $\Rightarrow$ M<FP>

Description: Moves contents of B-REG to File addressed by File Pointer. B-REG and File Pointer remain unchanged.

APPENDIX IV-continued

SAS `0 0 0 1 1 1 0 1`

Operation: (A) ⇒ M<SP>

Description: Moves contents of A-REG to Stack addressed by Stack Pointer. A-REG and Stack Pointer remain unchanged.

SAF `0 1 0 1 1 1 0 1`
`1 0 0 1 1 1 0 1`
`1 1 0 1 1 1 0 1`

Operation: (A) ⇒ M<FP>

Description: Moves contents of A-REG to File addressed by File Pointer. A-REG and File Pointer remain unchanged.

COMP `X X 0 1 1 1 1 0`

Operation:
$A = B$
$A = B \rightarrow T_2$
$1 \rightarrow C_G$
If $A = B$, $C_{in} \rightarrow C_{out}$
If $A \neq B$, $0 \rightarrow C_{out}$ Description: Compares contents of A-REG and B-REG. Result is stored in $T_2$ of T-REG. A logic one is placed on Carry Generate. Carry out is conditional. If contents of A-REG equal contents of B-REG, then Carry Out is same as Carry In. If not equal then logic zero is placed on Carry Out.

SUBT `0 0 0 1 1 1 1 1`

Operation:
$A - B + T_3 \rightarrow A$
$T_3 \rightarrow C_G$
$C_{n+4} \rightarrow C_{out}$
$C_{n+4} \rightarrow T_3$
Overflow $\rightarrow T_2$ Description: Subtracts contents of B-REG from contents of A-REG with $T_3$ of T-REG carry input. Places remainder in A-REG. B-REG remain unchanged. Selects $T_3$ on Carry Generate and Ripple Carry on Carry Out to enable proper arithmetic. Enables $T_2$ and $T_3$ to store overflow and ripple carry conditions, respectively.

SUB `0 1 0 1 1 1 1 1`
`1 0 0 1 1 1 1 1`
`1 1 0 1 1 1 1 1`

Operation:
$A - B \rightarrow A$
$1 \rightarrow C_G$
$C_{n+4} \rightarrow C_{out}$
$C_{n+4} \rightarrow T_3$
Overflow $\rightarrow T_2$ Description: Subtracts contents of B-REG from contents of A-REG and places remainder in A-REG. B-REG remain unchanged. Selects logic one on Carry Generate and Ripple Carry on Carry Out to enable proper arithmetic. Enables $T_2$ and $T_3$ of T-REG to store overflow and ripple carry conditions, respectively.

OAC1 `0 0 1 0 0 0 0 0`

Operation: $A_3 \rightarrow$ CTL 1

Description: Selects $A_3$ or A-REG for CTL 1 output.

SRAL `0 1 1 0 0 0 0 0`
`1 0 1 0 0 0 0 0`

Operation:
$A \xrightarrow{S} A$
$ASU \rightarrow A_3$
$A_0 \rightarrow ASL$

Description: Shifts contents of A-REG one place to the right. Selects ASU as input to most significant bit position of A-REG. Selects least significant bit of A-REG on ASL output.

SRAA `1 1 1 0 0 0 0 0`

Operation:
$A \xrightarrow{S} A$
$A_3 \rightarrow A_3$
$A_0 \rightarrow ASL$

Description: Shifts contents of A-REG one place to the right with the most significant bit condition retained in its position. Selects least significant bit of A-REG on ASL output.

ORAC `0 0 1 0 0 0 0 1`

Operation:
$A \vee B \rightarrow A$
$\Sigma_3 \rightarrow$ CTL 1

Description: Performs the Logic "OR" of contents of A-REG and B-REG. Places result in A-REG. B-REG remain unchanged. Selects ALU output, $\Sigma_3$, to output the Logic "OR" of $A_3$ and $B_3$ on CTL 1.

APPENDIX IV-continued

ANAC
`0 1 1 0 0 0 0 1`
`1 0 1 0 0 0 0 1`
`1 1 1 0 0 0 0 1`

Operation: $A \wedge B \rightarrow A$
$\Sigma_3 \rightarrow$ CTL 1

Description: Performs the Logic "AND" of contents of A-REG and B-REG. Places result in A-REG. B-REG remain unchanged. Selects ALU output, $\Sigma_3$, to output the logic AND of $A_3$ and $B_3$ on CTL 1.

ISP
`0 0 1 0 0 0 1 0`

Operation: $SP + 1 \rightarrow SP$

Description: Increments Stack Pointer by one.

SRAL
`0 1 1 0 0 0 1 0`
`1 0 1 0 0 0 1 0`

Operation: $A \rightarrow A$
$ASU \rightarrow A_3$
$A_0 \rightarrow ASL$

Description: Shifts content of A-REG one place to the right. Selects ASU as input to most significant bit position of A-REG. Selects least significant bit of A-REG on ASL output.

SRAT
`1 1 1 0 0 0 1 0`

Operation: $T_3 \xrightarrow{S} A \xrightarrow{S} T_3$

Description: Shifts contents of A-REG one place to the right with contents of $T_3$ of T-REG shifting in most significant bit position of A-REG and the least significant bit content of A-REG shifting in $T_3$ of T-REG.

ENOR
`0 0 1 0 0 0 1 1`

Operation: $\overline{A \forall B} \rightarrow A$
$\Sigma_3 \rightarrow$ CTL 1

Description: Performs the of NOR function of contents of A-REG and B-REG. Places results in A-REG. B-REG remain unchanged. Selects ALU output, $\Sigma_3$, to output the exclusive NOR of $A_3$ and $B_3$ on CTL 1.

EOR
`0 1 1 0 0 0 1 1`
`1 0 1 0 0 0 1 1`
`1 1 1 0 0 0 1 1`

Operation: $A \forall B \rightarrow A$
$\Sigma_3 \rightarrow$ CTL 1

Description: Performs the exclusive OR function of contents of A-REG and B-REG. Places results in A-REG. B-REG remain unchanged. Selects ALU out, $\Sigma_3$, to output the exclusive OR of $A_3$ and $B_3$ on CTL 1.

DSP
`0 0 1 0 0 1 1 0`

Operation: $SP - 1 \rightarrow SP$

Description: Decrements Stack Pointer by one.

SLA
`0 1 1 0 0 1 1 0`
`1 0 1 0 0 1 1 0`

Operation: $A \xleftarrow{S} A$
$A_3 \rightarrow ASU$
$ASL \rightarrow A_0$

Description: Shifts contents of A-REG one place to the left. Most significant bit position of A-REG shifts out on ASU. ASL inputs shifts in least significant bit position of A-REG.

SLAT
`1 1 1 0 0 1 1 0`

Operation: $T_3 \xleftarrow{S} A \xleftarrow{S} T_3$

Description: Shifts contents of A-REG one place to the left with $T_3$ of T-REG shifting in least significant bit position of A-REG and most significant bit of A-REG shifting in $T_3$ of T-REG.

TIC1
`0 0 1 0 1 1 1 1`

Operation: $T_1 \rightarrow$ CTL 1

Description: Selects next to least significant bit of T-REG for CTL 1 output.

SLQM
`0 1 1 0 1 1 1 1`

Operation: $Q \xleftarrow{S} Q$
$ASL \rightarrow Q_0$
$Q_3 \rightarrow QSU$

Description: Shifts contents of Q-REG one place to the left. Selects ASL as input to least significant bit position of Q-REG. Selects most significant bit of Q-REG for QSU output.

SLQ
`1 0 1 0 1 1 1 1`
`1 1 1 0 1 1 1 1`

APPENDIX IV-continued

Operation: $Q \xleftarrow{S} Q$
$QSL \rightarrow Q_0$
$Q_3 \rightarrow QSU$

Description: Shifts contents of Q-REG one place to the left. Selects QSL as input to least significant bit position of Q-REG. Selects most significant bit of Q-REG for QSU output.

SRLN
`0 0 1 0 1 0 0 0`
`0 1 1 0 1 0 0 0`
`1 0 1 0 1 0 0 0`

Operation: $A \xrightarrow{S} A$
$ASU \rightarrow A_3$
$A_0 \rightarrow ASL$
$Q \xrightarrow{S} Q$
$QSU \rightarrow Q_3$
$Q_0 \rightarrow QSL$
$A_2 \forall A_1 \rightarrow CTL\ 1$ Description: Shifts contents of A-REG and Q-REG one place to the right. Selects inputs, ASU and QSU, to the most significant bit positions of A-REG and Q-REG, respectively. Selects the least significant bit positions of A-REG and Q-REG as outputs on ASL and QSL, respectively. Selects look ahead normalize condition of A-REG for CTL 1 output.

SRLA
`1 1 1 0 1 0 0 0`

Operation: $A \xrightarrow{S} A$
$A_3 \rightarrow A_3$
$A_0 \rightarrow ASL$
$Q \xrightarrow{S} Q$
$QSU \rightarrow Q_3$
$Q_0 \rightarrow QSL$
$A_2 \forall A_1 \rightarrow CTL\ 1$ Description: Shifts contents of A-REG and Q-REG one place to the right. Most significant bit condition of A-REG retained in its position. Selects QSU as input to most significant bit position of Q-REG. Selects the least significant bit positions of A-REG and Q-REG as outputs on ASL and QSL, respectively. Selects look ahead normalize condition of A-REG for CTL 1 output.

OSCI
`0 0 1 0 1 0 0 1`

Operation: Stack File $\rightarrow$ CTL 1

Description: Selects Stack File on CTL 1 output. If Stack Pointer in all ones condition, CTL 1 = 1.

SRQ
`0 1 1 0 1 0 0 1`
`1 0 1 0 1 0 0 1`

Operation: $Q \xrightarrow{S} Q$
$QSU \rightarrow Q_3$
$Q_0 \rightarrow QSL$

Description: Shifts contents of Q-REG one place to the right. Selects QSU input to most significant bit position of Q-REG. Selects least significant bit of Q-REG on QSL output.

SRQZ
`1 1 1 0 1 0 0 1`

Operation: $Q \xrightarrow{S} Q$
$0 \rightarrow Q_3$
$Q_0 \rightarrow QSL$

Description: Shifts contents of Q-REG one place to the right with Logic zero shifting into most significant bit position of Q-REG. Selects least significant bit of Q-REG on QSL output.

LSF
`0 0 1 0 1 0 1 0`

Operation: (FP) $\rightarrow$ SP

Description: Loads Stack Pointer with contents of File Pointer.

SRLL
`0 1 1 0 1 0 1 0`
`1 0 1 0 1 0 1 0`

Operation: $A \xrightarrow{S} A$
$ASU \rightarrow A_3$
$A_0 \rightarrow ASL$
$Q \xrightarrow{S} Q$
$QSU \rightarrow Q_3$
$Q_0 \rightarrow QSL$ Description: Shifts contents of A-REG and Q-REG one place to the right. Selects ASU and QSU as inputs to most significant bit position of A-REG and Q-REG, respectively. Selects least significant bits of A-REG and Q-REG as outputs on ASL and QSL, respectively.

SRLO
`1 1 1 0 1 0 1 0`

Operation: $A \xrightarrow{S} A$
$A_3 \forall T_2 \rightarrow A_3$

APPENDIX IV-continued $A_0 \rightarrow ASL$
$Q \xrightarrow{S} Q$
$QSU \rightarrow Q_3$
$Q_0 \rightarrow QSL$ Description: Shifts contents of A-REG and Q-REG one place to the right. Selects overflow condition of A-REG into most significant bit position of A-REG. Selects QSU as input to most significant bit position of Q-REG. Selects least significant bits of A-REG and Q-REG as outputs on ASL and QSL, respectively.

TaC1 [0 0 1 0 1 0 1 1]

Operation: $T_2 \rightarrow CTL\ 1$

Description: Selects next to most significant bit of T-REG for CTL 1 output.

SRQ [0 1 1 0 1 0 1 1]
[1 0 1 0 1 0 1 1]

Operation: $Q \xrightarrow{S} Q$
$QSU \rightarrow Q_3$
$Q_0 \rightarrow QSL$

Description: Shifts contents of Q-REG one place to the right. Selects QSU as input to most significant bit position of Q-REG. Selects least significant bit of Q-REG for QSL output.

SRQM [1 1 1 0 1 0 1 1]

Operation: $Q \xrightarrow{S} Q$
$ASU \rightarrow Q_3$
$Q_0 \rightarrow QSL$

Description: Shifts contents of Q-REG one place to the right. Selects ASU as input to most significant bit position of Q-REG. Selects least significant bit of Q-REG for QSL output.

SLLN [0 0 1 0 1 1 0 0]
[1 0 1 0 1 1 0 0]
[1 1 1 0 1 1 0 0]

Operation: $A \xleftarrow{S} A$
$ASL \rightarrow A_0$
$A_3 \rightarrow ASU$
$Q \xleftarrow{S} Q$
$QSL \rightarrow Q_0$
$Q_3 \rightarrow QSU$
$A_2 \forall A_1 \rightarrow CTL\ 1$ Description: Shifts contents of A-REG and Q-REG one place to the left. Selects ASL and QSL as inputs to least significant bit positions of A-REG and Q-REG, respectively. Selects most significant bits of A-REG and Q-REG as outputs on ASU and QSU, respectively. Selects look ahead normalize condition of A-REG for CTL 1 output.

SLLZ [0 1 1 0 1 1 0 0]

Operation: $A \xleftarrow{S} A$
$ASL \rightarrow A_0$
$A_3 \rightarrow ASU$
$Q \xleftarrow{S} Q$
$0 \rightarrow Q_0$
$Q_3 \rightarrow QSU$
$A_2 \forall A_1 \quad CTL\ 1$ Description: Shifts contents of A-REG and Q-REG one place to the left. Selects ASL as input to least significant bit position of A-REG. Selects logic zero or input to least significant bit position of Q-REG. Selects most significant bits of A-REG and Q-REG as outputs on ASU and QSU, respectively. Selects look ahead normalize condition of A-REG for CTL 1 output.

NORM [0 0 1 0 1 1 1 0]

Operation: $A_3 \forall A_2 \rightarrow CTL\ 1$

Description: Checks present contents of A-REG for normalize condition and selects for CTL 1 output.

SLQZ [0 1 1 0 1 1 1 0]

Operation: $Q \xleftarrow{S} Q$
$0 \rightarrow Q_0$
$Q_3 \rightarrow QSU$

Description: Shifts contents of Q-REG one place to the left. Selects logic zero as input to least significant bit position of Q-REG. Selects most significant bit of Q-REG for QSU output.

SLQ [1 0 1 0 1 1 1 0]
[1 1 1 0 1 1 1 0]

APPENDIX IV-continued

| | |
|---|---|
| Operation: | $Q \xleftarrow{S} Q$<br>$QSL \rightarrow Q_0$<br>$Q_3 \rightarrow QSU$ |
| Description: | Shifts contents of Q-REG one place to the left. Selects QSL as input to least significant bit position of Q-REG. Selects most significant bit of Q-REG for QSU output. |
| LF | 0 0 1 1 X X X X |
| Operation: | OPCXX → FP |
| Description: | Loads File Pointer with the four least significant bits of the micro-code.<br>Examples:<br>(1) If micro-code = 00110001<br>FP = 0001<br>(2) If micro-code = 00110100<br>FP = 0100<br>(3) If micro-code = 00111111<br>FP = 1111 |

What is claimed:

1. A computer system comprising:

arithmetic unit including a first plurality of identical general purpose computer chips;

micro-code control section including a second plurality of the same general purpose computer chips;

means including a computer system control memory for receiving address input information from said micro-code control section and applying micro-code control signals to each of said general purpose computer chips; and storage means for supplying stored information to said general purpose computer chips from selectively addressed storage locations.

2. A system as defined in claim 1 wherein each of said general purpose computer chips includes a store for at least several bytes or words of information, first means are provided for accessing said store on a first-in, last-out basis, second means are provided for accessing said chip store on a random access basis, and means are provided for selecting one of said first and second accessing means.

3. A system as defined in claim 2 wherein the first-in, last-out store accessing means includes an address-selection register, and recirculation loop circuit means are provided for selectively incrementing or decrementing said selection register.

4. A system as defined in claim 1 wherein each of said general purpose chips includes a store for holding bytes of binary information and wherein first and second register means are provided for identifying store locations, means are provided for selectively accessing said store in accordance with said first or said second register means, and recirculation loop circuit means are further provided for selectively incrementing or decrementing said first register means.

5. A system as defined in claim 1 wherein said each of said chips are provided with a discrete plurality of mode code terminals, and means are provided on each chip responsive solely to micro-code control signals applied to said mode-code terminals for selectively establishing logic circuitry within said chip to handle the complete arithmetic, transfer, shifting, and logic operations (1) related to the least significant byte of a multi-byte word, (2) related to the most significant byte of a multi-byte word, (3) related to an intermediate byte of a multi-byte word, or (4) independently of signals applied to other chips.

6. A computer system as defined in claim 1 wherein:

a. each sadi general purpose computer chip carries means including a multiplicity of interconnected active solid state circuit components for performing selected digital logic operations;

b. each said general purpose computer chip includes a plurality of registers each including associated storage means for storing a byte made up of a discrete plurality of bite of binary information, and wherein each byte may form part of a longer digital word;

c. each said general purpose computer chip includes a discrete plurality of mode-code terminals secured to said chips; and d. means are provided on said chip which are responsive solely to signals applied to said mode-code terminals for selectively establishing one and only one of the following four distinctly different sets of logic circuitry within said ship to handle the complete arithmetic, transfer, shifting, and logic operations (1) related to the least significant byte of a multi-byte word, (2) related to the most significant byte of a multi-byte word, (3) related to an intermediate byte of a multi-byte word, or (4) independently of signals applied to other chips, depending solely on said signals applied to said mode-code terminals.

7. In a general purpose computer chip useful for arithmetic logic or central processing unit operations with a minimum of external components, the combination comprising:

a. a chip carrying means including a multiplicity of interconnected active solid state circuit components for performing selected digital logic operations;

c. a discrete plurality of mode-code terminals secured to said chip; and d. means are included on said chip which are responsive solely to signals applied to said mode-code terminals for selectively establishing one and only one of the following four distinctly different sets of logic circuitry within said chip to handle the complete arithmetic, transfer, shifting, and logic operations (1) related to the least significant byte of a multi-byte word, (2) related to the most significant byte of a multi-byte word, (3) related to an intermediate byte of a multi-byte word, or (4) independent of signals applied to other chips, depending solely on the signals applied to said mode-code terminals.

8. A combination as defined in claim 7, wherein at least two identical chips are provided, and means are provided for connecting said chips to handle arithmetic operations involving the combination of operands each including at least two bytes, in parallel; and wherein means are included in said interconnected circuit components for handling all carries within said chips.

9. A combination as defined in claim 7, wherein a sequence of at least three of said registers are electrically grouped to form an array;

wherein means are provided for storing or retrieving bytes of digital information from successive registers in said array sequentially; and wherein additional means are provided for storing or retrieving bytes of information from selected registers in said array on a random access basis.

10. A combination as defined in claim 7, wherein said chip includes a set of discrete input terminals for receiving in parallel the input bits of one byte of digital information; and wherein said chip further includes a second set of discrete input terminals for receiving in parallel the input bits of a second byte of digital information.

11. A combination set forth in claim 10, wherein several of said registers are directly associated with an arithmetic unit on said chip; and wherein said chip includes output multiplexing means for selectively outputting bytes of digital information fron either set of input terminals, or from either of two of said registers directly associated with the arithmetic unit.

12. A combination as defined in claim 7, wherein an arithmetic unit is provided on said chip, several of said registers are directly associated with said arithmetic unit, and means are provided for directly and concurrently applying digital information from at least two of said registers to said arithmetic unit.

13. A combination as defined in claim 12, wherein recirculating switching circuit means are provided for selectively applying digital information to at least one of said registers associated with said arithmetic unit, with the digital information shifted in significance by one digit position.

14. A combination as set forth in claim 7, wherein said chip includes a plurality of output terminals, and means are provided on said chip for representing binary digital signals at said output terminals from said chip on a three-state basis with first and second output voltages representing a binary 1 and a binary 0, respectively, and a high impedance output representing no signal at the output terminals, whereby output leads from said chip terminals may be directly connected to other chip output terminals without the need for special combining circuits or buffering.

15. A logic circuit including at least two chips as defined in claim 14, and further comprising means for electrically connecting output terminals of said two chips directly together.

* * * * *